US012594753B2

(12) United States Patent
Bjeremyr

(10) Patent No.: US 12,594,753 B2
(45) Date of Patent: Apr. 7, 2026

(54) WEAR RESISTANT SHEET FOR BUILDING PANELS AND METHODS TO PRODUCE SUCH WEAR RESISTANT SHEET

(71) Applicant: Välinge Innovation AB, Viken (SE)

(72) Inventor: Martin Bjeremyr, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 101 days.

(21) Appl. No.: 18/510,800

(22) Filed: Nov. 16, 2023

(65) Prior Publication Data

US 2024/0165943 A1 May 23, 2024

(30) Foreign Application Priority Data

Nov. 18, 2022 (SE) ..................................... 2251353-5

(51) Int. Cl.
*B32B 37/24* (2006.01)
*B32B 5/16* (2006.01)
(Continued)

(52) U.S. Cl.
CPC ................ *B32B 37/24* (2013.01); *B32B 5/16* (2013.01); *B32B 7/12* (2013.01); *B32B 27/14* (2013.01); *B32B 27/304* (2013.01); *B32B 37/06* (2013.01); *B32B 37/10* (2013.01); *B32B 37/12* (2013.01); *E04C 2/20* (2013.01);
(Continued)

(58) Field of Classification Search
CPC .. B32B 37/24; B32B 5/16; B32B 7/12; B32B 27/14; B32B 27/304; B32B 37/06; B32B 37/10; B32B 37/12; B32B 2264/1023; B32B 2270/00; B32B 2307/554; B32B 2307/718; B32B 2307/7376;
(Continued)

(56) References Cited

U.S. PATENT DOCUMENTS

| | | | | |
|---|---|---|---|---|
| 2010/0300030 A1* | 12/2010 | Pervan | ................... | B32B 21/13 |
| | | | | 428/292.4 |
| 2016/0016390 A1* | 1/2016 | Lundblad | .................. | B32B 5/16 |
| | | | | 156/244.11 |
| 2021/0023832 A1 | 1/2021 | Ziegler et al. | | |

FOREIGN PATENT DOCUMENTS

| | | |
|---|---|---|
| CN | 102733576 A | 4/2014 |
| CN | 109989552 A | 8/2021 |
| | (Continued) | |

OTHER PUBLICATIONS

Swedish Search Report mailed on May 2, 2023, by the Swedish Patent and Registration Office for Swedish Application No. 2251353-5, 11 pages.

(Continued)

*Primary Examiner* — Cynthia L Schaller

(74) *Attorney, Agent, or Firm* — Boone IP Law

(57) ABSTRACT

A method to produce a wear resistant sheet including providing a first foil, applying a second foil above the first foil, applying a third foil above the second foil, applying a wear resistant layer on the first foil and/or on the second foil prior to applying the second foil above the first foil, applying a wear resistant layer on the second foil and/or the third foil prior to applying the third foil above the second foil, and adhering the first foil, the second foil and the third foil together by means of heat and pressure for forming the wear resistant sheet, where the wear resistant layers are provided between the first and second foil and between the second and third foil.

14 Claims, 5 Drawing Sheets

(51) Int. Cl.

| | |
|---|---|
| *B32B 7/12* | (2006.01) |
| *B32B 27/14* | (2006.01) |
| *B32B 27/30* | (2006.01) |
| *B32B 37/06* | (2006.01) |
| *B32B 37/10* | (2006.01) |
| *B32B 37/12* | (2006.01) |
| *E04C 2/20* | (2006.01) |

(52) U.S. Cl.
CPC ... *B32B 2264/1023* (2020.08); *B32B 2270/00* (2013.01); *B32B 2307/554* (2013.01); *B32B 2307/718* (2013.01); *B32B 2307/7376* (2023.05); *B32B 2327/06* (2013.01); *B32B 2607/00* (2013.01)

(58) Field of Classification Search
CPC . B32B 2327/06; B32B 2607/00; B32B 27/08; B32B 27/20; E04C 2/20
See application file for complete search history.

(56) References Cited

FOREIGN PATENT DOCUMENTS

| | | | |
|---|---|---|---|
| EP | 2785929 B1 | 8/2016 | |
| EP | 3095927 A1 | 11/2016 | |
| WO | WO-2013079950 A1 * | 6/2013 | ............ B32B 27/08 |
| WO | 2016010471 A1 | 1/2021 | |

OTHER PUBLICATIONS

U.S. Appl. No. 18/325,534, Per Nygren, filed May 30, 2023.
U.S. Appl. No. 18/325,538, Christoffer Nilsson, filed May 30, 2023.
U.S. Appl. No. 14/994,593, Niclas Håkansson, filed Jan. 13, 2016.
U.S. Appl. No. 18/192,858, Per Nygren, filed Mar. 30, 2023.
U.S. Appl. No. 18/487,049, Christer Lundblad, filed Oct. 14, 2023.
U.S. Appl. No. 18/409,984, Darko Pervan, filed Jan. 11, 2024.
U.S. Appl. No. 18/420,003, Niclas Håkansson, filed Jan. 23, 2024.
U.S. Appl. No. 19/221,756, Christer Lundblad, filed May 29, 2025.

* cited by examiner

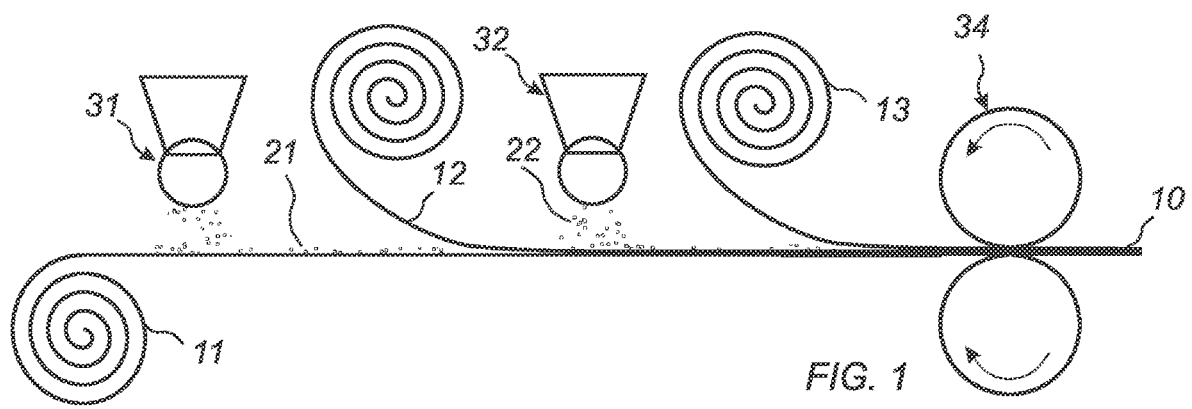
*FIG. 1*
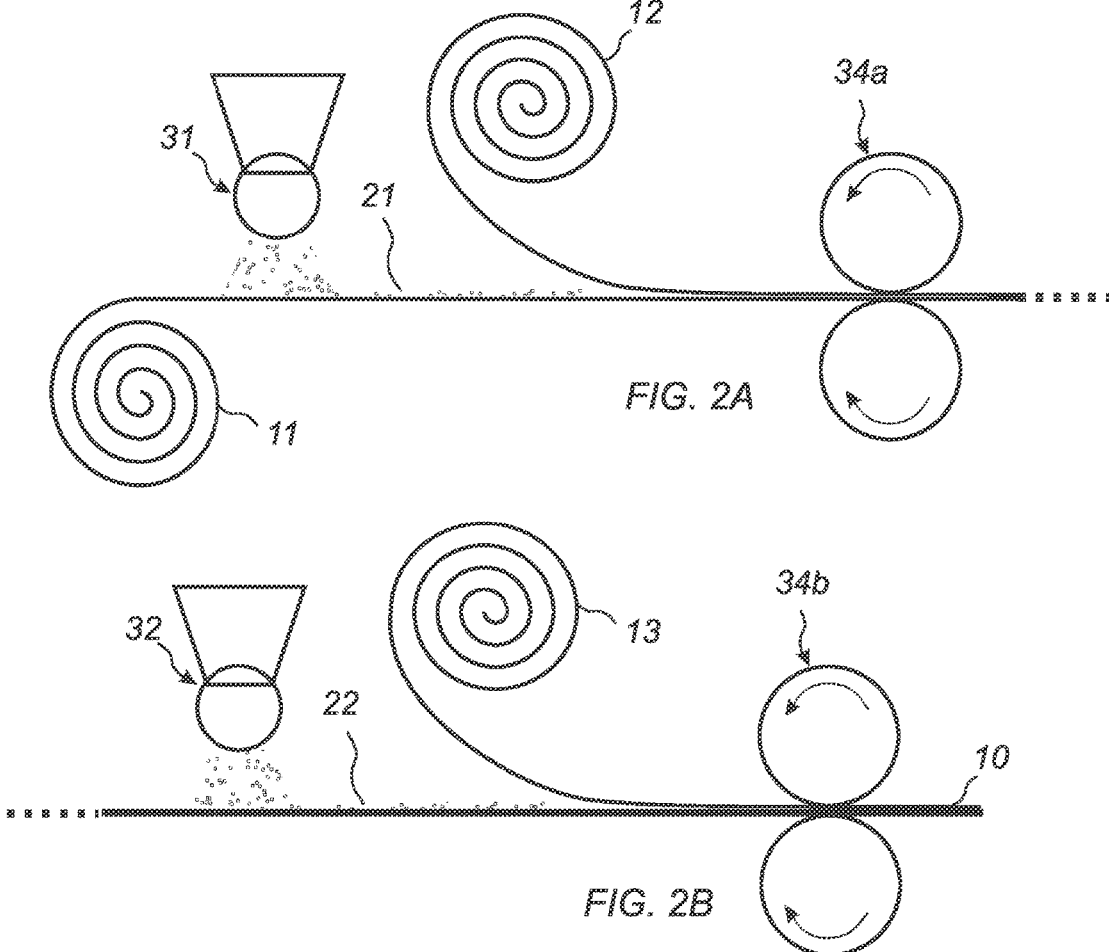
*FIG. 2A*
*FIG. 2B*

WEAR RESISTANT SHEET FOR BUILDING PANELS AND METHODS TO PRODUCE SUCH WEAR RESISTANT SHEET

CROSS REFERENCE TO RELATED APPLICATIONS

The present application claims the benefit of Swedish Application No. 2251353-5, filed on Nov. 18, 2022. The entire contents of Swedish Application No. 2251353-5 are hereby incorporated herein by reference in their entirety.

TECHNICAL FIELD

The present invention relates to the field of building panels, of wear resistant sheets for such building panels and of methods for producing such wear resistant sheets and building panels.

TECHNICAL BACKGROUND

In recent years, so-called Luxury Vinyl Tiles and Planks (LVT) have gained increasing success. These types of floor panels usually comprise a thermoplastic core, a thermoplastic décor layer arranged on the core, a transparent wear layer on the décor layer, and a coating applied on the wear layer. The thermoplastic material is often PVC. The wear layer is conventionally a PVC foil, for example, having a thickness of 0.2-0.7 mm. The coating applied on the wear layer is conventionally a UV curing polyurethane coating. The wear layer together with the coating provides the wear resistance of the floor panel and protects the décor layer.

However, when subjecting floor panels to wear, it has been shown that the coating and the wear layer are relatively easily worn down, or at least worn such that the appearance of the wear layer is affected, such as having scratches and/or not being transparent any longer. Compared to a conventional laminate floor panel, the wear resistance of a LVT floor panel is inferior. However, LVT floors offer several advantages over, for example, laminate floors, such as deep embossing, dimensional stability related to humidity, moisture resistance and sound absorbing properties.

It is therefore desirable to provide a LVT product having improved wear resistance and/or improved appearance properties.

SUMMARY

An object of at least embodiments of the present inventive concept is to provide improvements over known art. This object may be achieved by a technique defined in the appended independent claims; certain embodiment being set forth in the related dependent claims.

In a first aspect of the present inventive concept there is provided a method to produce a wear resistant sheet comprising:

providing a first foil comprising a thermoplastic material,
  applying a second foil comprising a thermoplastic material above the first foil,
  applying a third foil comprising a thermoplastic material above the second foil,
  applying a wear resistant layer comprising wear resistant particles on the first foil and/or on the second foil prior to applying the second foil above the first foil,
  applying a wear resistant layer comprising wear resistant particles on the second foil and/or the third foil prior to applying the third foil above the second foil, and adhering the first foil, the second foil and the third foil together by means of heat and pressure for forming the wear resistant sheet, wherein the wear resistant layers are provided between the first and second foil and between the second and third foil.

The wear resistant layer comprising wear resistant particles may be applied in powder form, in fluid form, as a paste, as a sheet, or as a mix with e.g. an adhesive.

The wear resistant layer may be applied by scattering, by rolling or by any other suitable application method.

In an embodiment the wear resistant layer between the first foil and the second foil, is applied, e.g., by scattering, onto the first foil before applying the second foil. In an alternative embodiment the wear resistant layer is applied, e.g., by scattering, onto the second foil before applying it to the first foil.

Further, the wear resistant layer between the second foil and the third foil, may be applied, e.g., by scattering, onto the second foil before applying the third foil. Alternatively, the wear resistant layer may be applied, e.g., by scattering, onto the third foil before applying it to the second foil.

In an embodiment of the present inventive concept each wear resistant layer may comprise an amount of at least 99 wt. % of the wear resistant particles, or at least 99.5 wt. % of the wear resistant particles.

In an embodiment the wear resistant particles are chosen from aluminum oxide, quartz, diamond, diamond dust, boron nitride, almandine, glass, glass spheres, feldspar, silicon carbide, boron carbide, granite or a combination of such.

In an embodiment the wear resistant particles are aluminum oxide particles.

In another embodiment the wear resistant particles arranged between the first foil and the second foil are enclosed therein, at least in a direction essentially parallel to the thickness of the foils or in a direction essentially perpendicular to the longitudinal extension of the foils, and the wear resistant particles arranged between the second foil and the third foil are enclosed therein, at least in a direction essentially parallel to the thickness of the foils or in a direction essentially perpendicular to the longitudinal extension of the foils, after adhering the foils together. The wear resistant particles arranged the first foil and the second foil may be fixedly enclosed therein, and the wear resistant particles arranged between the second foil and the third foil may be fixedly enclosed therein, after adhering the foils together. Fixedly enclosed means that the wear resistant particles are not able to move or detach from the foils after the manufacturing process.

Alternatively, none of the wear resistant particles arranged between the second foil and the third foil protrudes from the third foil after adhering the foils together.

The wear resistant particles may have grain sizes mainly, i.e. at least 94% of the wear resistant particles, within 53 to 102 μm, which may correspond to a grit size of 180 according to the well-known FEPA standard.

In an embodiment the wear resistant layer, applied between the first foil and the second foil, is applied at an amount of 5-30 g/m², 7.5-25 g/m², or 10-20 g/m².

Further, the wear resistant layer, applied between the second foil and the third foil, may be applied at an amount of 5-30 g/m², 7.5-25 g/m², or 10-20 g/m².

In a preferred embodiment the amount of wear resistant layer between the first and second foil and between the second and third foil is substantially equal.

Further, the total amount of the wear resistant layers applied, between the first foil and the second foil and between the second foil and the third foil, may be 10-60 g/m², 15-50 g/m², or 20-40 g/m².

In an embodiment the first foil the second foil and/or the third foil comprises any one of polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The foils may comprise at least 50 wt. % of the thermoplastic material, at least 60 wt. % of the thermoplastic material or at least 70 wt. % of the thermoplastic material.

The first foil, the second foil and the third foil each may have a thickness of 20-500 μm., or 50-200 μm. Alternatively, the first foil, the second foil and the third foil may have a thickness of at least 20 μm. or at least 50 μm. The thickness of each foil are in an embodiment the same. Alternatively, the thickness of the foils may be different.

The wear resistant particles may have an average particle size being less than the thickness of the uppermost foil, in this embodiment it is the third foil. The wear resistant particles may have an average particle size being larger than the thickness of the third foil. However, during pressing, the wear resistant particles are pressed into the first and second foil such that the wear resistant particles do not protrude beyond an upper surface of the third foil after pressing, although the wear resistant particles having an average particle size exceeding the thickness of the third foil.

The ratio between the size of the wear resistant particles and the thickness of the uppermost foil may be less than 1.5:1.

The ratio between the size of the wear resistant particles and the thickness of the first foil may be less than 1.5:1.

The ratio between the size of the wear resistant particles and the thickness of the second foil may be less than 1.5:1.

The ratio between the size of the wear resistant particles and the thickness of the third foil may be less than 1.5:1.

The ratio between the size of the wear resistant particles and the thickness of the any foil may be less than 1.5:1.

The method may further comprise applying scratch resistant particles in the uppermost wear resistant layer, which in an embodiment is between the second and the third foil. The scratch resistant particles may be or comprise nano-sized silica particles, preferably fused silica particles. The scratch resistant particles may be or comprise aluminum oxide. Having scratch particles at least in the uppermost wear resistant layer may decrease the risk of deep scratches in the top surface.

Further, even though a wear resistant sheet, as presented above, comprises three foils and two wear resistant layers it is possible and sometimes desirable to have additional foils and wear resistant layers forming such a wear resistant sheet. The illustrated method steps of applying a wear resistant layers and applying a foil are then repeated as many time as desirable.

In an embodiment the step of adhering the first foil, the second foil and the third foil together by means of heat and pressure for forming the wear resistant sheet is achieved by a combined heat and pressure process, preferably a lamination process. The lamination process may either be a static process or a continuous process, such as a calendaring process.

Further, the adhering of the foils for forming the wear resistant sheet may be made in one single step.

The step of adhering the foils together may be made with temperatures between 50-300° C., such as 50-220° ° C., such as 75 and 180° C. and with pressure between 1-100 bar, such as 1-50 bar, such as 1-30 bar, for a time period of 3-500 seconds, such as 5-300 seconds, such as 5-100 seconds.

In an embodiment the adhering of the foils may be made in a process where heat and pressure are applied separately.

Alternatively, the adhering of the foils may be made in a process where heat and pressure are applied, at least momentarily, simultaneously. The time for when the heat and pressure are applied simultaneously may be as short as 0.1 sec.

The step of adhering the foils together may further comprise cooling the wear resistant sheet.

The step of adhering the foils together may further comprise cooling the wear resistant sheet before the pressure is released from the wear resistant sheet.

In another embodiment, the adhering of the foils may be made in a static press, e.g. a Multidaylight press. The time period for such a static press may be much longer than the examples above, e.g. 10-20 min or more. If such a static press is used the adhering process may further include a cooling process.

In an embodiment of the present inventive concept, the method step to adhere the foils together according to any method presented above, may be a type of pre-lamination where the wear resistant sheet is not completely laminated together. The complete lamination of the wear resistant sheet is performed during a subsequent lamination, where the wear resistant sheet is applied on, e.g., a substrate and laminated together to form a building panel. Such a subsequent lamination and method to form a building panel is presented below.

In a second aspect of the present inventive concept there is provided a method to produce a building panel, comprising:

providing a substrate,
  applying a wear resistant sheet produced by any one of the embodiments presented above, above the substrate,
  adhering the substrate and the wear resistant sheet, by means of heat and pressure, to form the building panel.

In an embodiment, the method further comprising applying a decorative layer between the substrate and the wear resistant sheet before adhering them together by means of heat and pressure.

The decorative layer of the building panel may be a colored powder layer, a paper sheet, a polymer-based sheet, a wood-based sheet, a wood veneer, a cork-based sheet, or a fabric, woven or non-woven. The decorative layer may further be a printed layer, such as a printed polymer-based sheet or a printed layer above the substrate.

In an embodiment the step of adhering the substrate and the wear resistant sheet together by means of heat and pressure for forming the building panel is achieved by a combined heat and pressure process, preferably a lamination process. The lamination process may either be one or several static processes or continuous processes, such as calendaring processes.

Further, the adhering of at least the substrate and the wear resistant sheet for forming the building panel may be made in one single step.

The step of adhering at least the substrate and the wear resistant sheet may be made with temperatures between 50-300° C., such as 50-220° C., such as 75 and 180° ° C. and with pressure between 1-100 bar, such as 1-50 bar, such as 1-30 bar, for a time period of 3-500 seconds, such as 5-300 seconds, such as 5-100 seconds.

In an embodiment the adhering of at least the substrate and the wear resistant sheet may be made in a process where heat and pressure are applied separately.

Alternatively, the adhering of at least the substrate and the wear resistant sheet may be made in a process where heat and pressure are applied, at least momentarily, simultaneously. The time for when the heat and pressure are applied simultaneously may be as short as 0.1 sec.

The step of adhering at least the substrate and the wear resistant sheet together may further comprise cooling the building panel.

The step of adhering at least the substrate and the wear resistant sheet may further comprise cooling the building panel before the pressure is released from the building panel.

In another embodiment, the adhering of at least the substrate and the wear resistant sheet may be made in a static press, e.g., a Multidaylight press. The time period for such a static press may be much longer than the examples above, e.g., 10-20 min or more. If such a static press is used the adhering process may further include a cooling process.

In a third aspect of the present inventive concept there is provided a method to produce a building panel, comprising:

providing a substrate,
    applying a first foil comprising a thermoplastic material above the substrate,
    applying a second foil comprising a thermoplastic material above the first foil,
    applying a third foil comprising a thermoplastic material above the second foil,
    applying a wear resistant layer comprising wear resistant particles on the first foil and/or on the second foil prior to applying the second foil above the first foil,
    applying a wear resistant layer comprising wear resistant particles on the second foil and/or the third foil prior to applying the third foil above the second foil, and
    adhering the substrate, the first foil, the second foil and the third foil together, by means of heat and pressure for forming the building panel, wherein the wear resistant layer are provided between the first and the second foil and between the second and third foil.

The wear resistant layer comprising wear resistant particles may be applied in powder form, in fluid form, as a paste, as a sheet, or as a mix with e.g. an adhesive.

The wear resistant layer may be applied by scattering, by rolling or by any other suitable application method.

In an embodiment the wear resistant layer between the first foil and the second foil, is applied, e.g., by scattering, onto the first foil before applying the second foil. In an alternative embodiment the wear resistant layer is applied, e.g., by scattering, onto the second foil before applying it to the first foil.

Further, the wear resistant layer between the second foil and the third foil, may be applied, e.g., by scattering, onto the second foil before applying the third foil. Alternatively, the wear resistant layer may be applied, e.g., by scattering, onto the third foil before applying it to the second foil.

Preferably, each wear resistant layer may comprise an amount of at least 99 wt. % of the wear resistant particles, or at least 99.5 wt. % of the wear resistant particles.

In an embodiment the wear resistant particles are chosen from aluminum oxide, quartz, diamond, diamond dust, boron nitride, almandine, glass, glass spheres, feldspar, silicon carbide, boron carbide, granite or a combination of such.

In an embodiment the wear resistant particles are aluminum oxide particles.

Further, the wear resistant particles arranged between the first foil and the second foil may be enclosed therein, at least in a direction essentially parallel to the thickness of the foils, and the wear resistant particles arranged between the second foil and the third foil may be enclosed therein, at least in a direction essentially parallel to the thickness of the foils, after adhering the foils together. The wear resistant particles arranged the first foil and the second foil may be fixedly enclosed therein, and the wear resistant particles arranged between the second foil and the third foil may be fixedly enclosed therein, after adhering the foils together. Fixedly enclosed means that the wear resistant particles are not able to move or detach from the foils after the manufacturing process.

Alternatively, none of the wear resistant particles arranged between the second foil and the third foil protrudes from the third foil after adhering the foils together.

The wear resistant particles may have grain sizes mainly, i.e. at least 94% of the wear resistant particles, within 53 to 102 $\mu$m, which may correspond to a grit size of 180 according to the well-known FEPA standard.

In an embodiment the wear resistant layer, applied between the first foil and the second foil, is applied at an amount of 5-30 g/m$^2$, 7.5-25 g/m$^2$, or 10-20 g/m$^2$.

Further, the wear resistant layer, applied between the second foil and the third foil, may be applied at an amount of 5-30 g/m$^2$, 7.5-25 g/m$^2$, or 10-20 g/m$^2$.

In a preferred embodiment the amount of wear resistant layer between the first and second foil and between the second and third foil is substantially equal.

Further, the total amount of the wear resistant layers applied, between the first foil and the second foil and between the second foil and the third foil, may be 10-60 g/m$^2$, 15-50 g/m$^2$, or 20-40 g/m$^2$.

In an embodiment the first foil the second foil and/or the third foil comprises any one of polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The foils may comprise at least 50 wt. % of the thermoplastic material, at least 60 wt. % of the thermoplastic material or at least 70 wt. % of the thermoplastic material.

The first foil, the second foil and the third foil each may have a thickness of 20-500 $\mu$m, or 50-200 $\mu$m. Alternatively, the first foil, the second foil and the third foil may have a thickness of at least 20 $\mu$m or at least 50 $\mu$m.

The thickness of each foil are in an embodiment the same. Alternatively, the thickness of the foils may be different.

The wear resistant particles may have an average particle size being less than the thickness of the uppermost foil, in this embodiment it is the third foil. The wear resistant particles may have an average particle size being larger than the thickness of the third foil. However, during pressing, the wear resistant particles are pressed into the first and second foil such that the wear resistant particles do not protrude beyond an upper surface of the third foil after pressing, although the wear resistant particles having an average particle size exceeding the thickness of the third foil.

The ratio between the size of the wear resistant particles and the thickness of the uppermost foil may be less than 1.5:1.

The ratio between the size of the wear resistant particles and the thickness of the first foil may be less than 1.5:1.

The ratio between the size of the wear resistant particles and the thickness of the second foil may be less than 1.5:1.

The ratio between the size of the wear resistant particles and the thickness of the third foil may be less than 1.5:1.

The ratio between the size of the wear resistant particles and the thickness of the any foil may be less than 1.5:1.

The method may further comprise applying scratch resistant particles in the uppermost wear resistant layer, which in an embodiment is between the second and the third foil. The scratch resistant particles may be or comprise nano-sized silica particles, preferably fused silica particles. The scratch resistant particles may be or comprise aluminum oxide. Having scratch particles at least in the uppermost wear resistant layer may decrease the risk of deep scratches in the top surface.

In an embodiment, the method further comprising applying a decorative layer between the substrate and the first foil before adhering at least the substrate and the foils together by means of heat and pressure.

The decorative layer of the building panel may be a colored powder layer, a paper sheet, a polymer-based sheet, a wood-based sheet, a wood veneer, a cork-based sheet, or a fabric, woven or non-woven. The decorative layer may further be a printed layer, such as a printed polymer-based sheet or a printed layer above the substrate.

In an embodiment the step of adhering the substrate and the wear resistant sheet together by means of heat and pressure for forming the building panel is achieved by a combined heat and pressure process, preferably a lamination process. The lamination process may either be one or several static processes or continuous processes, such as calendaring processes.

Further, the adhering of at least the substrate and the wear resistant sheet for forming the building panel may be made in one single step.

The step of adhering at least the substrate and the wear resistant sheet may be made with temperatures between 50-300° ° C., such as 50-220° C., such as 75 and 180° C. and with pressure between 1-100 bar, such as 1-50 bar, such as 1-30 bar, for a time period of 3-500 seconds, such as 5-300 seconds, such as 5-100 seconds.

In an embodiment the adhering of at least the substrate and the wear resistant sheet may be made in a process where heat and pressure are applied separately.

Alternatively, the adhering of at least the substrate and the wear resistant sheet may be made in a process where heat and pressure are applied, at least momentarily, simultaneously. The time for when the heat and pressure are applied simultaneously may be as short as 0.1 sec.

The step of adhering at least the substrate and the wear resistant sheet together may further comprise cooling the building panel.

The step of adhering at least the substrate and the wear resistant sheet may further comprise cooling the building panel before the pressure is released from the building panel.

In another embodiment, the adhering of at least the substrate and the wear resistant sheet may be made in a static press, e.g., a Multidaylight press. The time period for such a static press may be much longer than the examples above, e.g., 10-20 min. or more. If such a static press is used the adhering process may further include a cooling process.

In an embodiment the substrate comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In an embodiment the substrate may be foamed.

Further, the substrate may be a single layer substrate or a multi-layer substrate.

In a fourth aspect of the present inventive concept there is provided a method to produce a building panel, comprising
providing a substrate,
applying a first foil comprising a thermoplastic material above the substrate,
applying a second foil comprising a thermoplastic material above the first foil,
applying a wear resistant layer comprising wear resistant particles on the substrate and/or on the first foil prior to applying the first foil above the substrate,
applying a wear resistant layer comprising wear resistant particles on the first foil and/or on the second foil prior to applying the second foil above the first foil, and
adhering the substrate, the first foil and the second foil together, by means of heat and pressure for forming the building panel, wherein the wear resistant layers are provided between the substrate, the first foil and the second foil.

The wear resistant layer comprising wear resistant particles may be applied in powder form, in fluid form, as a paste, as a sheet, or as a mix with e.g. an adhesive.

The wear resistant layer may be applied by scattering, by rolling or by any other suitable application method.

In an embodiment the wear resistant layer between the substrate and the first foil, is applied, e.g., by scattering, onto the substrate before applying the first foil. In an alternative embodiment the wear resistant layer is applied, e.g., by scattering, onto the first foil before applying it to the substrate.

Further, the wear resistant layer between the first foil and the second foil, may be applied, e.g., by scattering, onto the first foil before applying the second foil. Alternatively, the wear resistant layer may be applied, e.g., by scattering, onto the second foil before applying it to the first foil.

Preferably, each wear resistant layer may comprise an amount of at least 99 wt. % of the wear resistant particles, or at least 99.5 wt. % of the wear resistant particles.

In an embodiment the wear resistant particles are chosen from aluminum oxide, quartz, diamond, diamond dust, boron nitride, almandine, glass, glass spheres, feldspar, silicon carbide, boron carbide, granite or a combination of such.

In an embodiment the wear resistant particles are aluminum oxide particles.

Further, the wear resistant particles arranged between the substrate and the first foil may be enclosed therein, at least in a direction essentially parallel to the thickness of the foils, and the wear resistant particles arranged between the first foil and the second foil may be enclosed therein, at least in a direction essentially parallel to the thickness of the foils, after adhering the foils together. The wear resistant particles arranged between the substrate and the first foil may be fixedly enclosed therein, and the wear resistant particles arranged between the first foil and the second foil may be fixedly enclosed therein, after adhering the foils together. Fixedly enclosed means that the wear resistant particles are not able to move or detach from the foils after the manufacturing process.

Alternatively, none of the wear resistant particles arranged between the first foil and the second foil protrudes from the second foil after adhering the foils together.

The wear resistant particles may have grain sizes mainly, i.e. at least 94% of the wear resistant particles, within 53 to 102 μm, which may correspond to a grit size of 180 according to the well-known FEPA standard.

In an embodiment the wear resistant layer, applied between the substrate and the first foil, is applied at an amount of 5-30 g/m$^2$, 7.5-25 g/m$^2$, or 10-20 g/m$^2$.

Further, the wear resistant layer, applied between the first foil and the second foil, may be applied at an amount of 5-30 g/m$^2$, 7.5-25 g/m$^2$, or 10-20 g/m$^2$.

In a preferred embodiment the amount of wear resistant layer between the substrate and the first foil and between the first and second foil is substantially equal.

Further, the total amount of the wear resistant layers applied, between the substrate and the first foil and between the first foil and the second foil, may be 10-60 g/m$^2$, 15-50 g/m$^2$, or 20-40 g/m$^2$.

In an embodiment the first foil and/or the second foil comprises any one of polyvinyl chloride (PVC), polyester, polypropylene (PP), polyethylene (PE), polystyrene (PS), polyurethane (PU), polyethylene terephthalate (PET), poly-acrylate, methacrylate, polycarbonate, polyvinyl butyral, polybutylene terephthalate, or a combination thereof.

The foils may comprise at least 50 wt. % of the thermoplastic material, at least 60 wt. % of the thermoplastic material or at least 70 wt. % of the thermoplastic material.

The first foil and the second foil each may have a thickness of 20-500 µm, or 50-200 µm. Alternatively, the first foil and the second foil may have a thickness of at least 20 µm. or at least 50 µm.

The thickness of each foil are in an embodiment the same. Alternatively, the thickness of the foils may be different.

The wear resistant particles may have an average particle size being less than the thickness of the uppermost foil, in this embodiment it is the second foil. The wear resistant particles may have an average particle size being larger than the thickness of the second foil. However, during pressing, the wear resistant particles may be pressed into the substrate and the first foil such that the wear resistant particles do not protrude beyond an upper surface of the second foil after pressing, although the wear resistant particles having an average particle size exceeding the thickness of the second foil.

The ratio between the size of the wear resistant particles and the thickness of the uppermost foil may be less than 1.5:1.

The ratio between the size of the wear resistant particles and the thickness of the first foil may be less than 1.5:1.

The ratio between the size of the wear resistant particles and the thickness of the second foil may be less than 1.5:1.

The ratio between the size of the wear resistant particles and the thickness of the any foil may be less than 1.5:1.

The method may further comprise applying scratch resistant particles in the uppermost wear resistant layer, which in an embodiment is between the first and the second foil. The scratch resistant particles may be or comprise nano-sized silica particles, preferably fused silica particles. The scratch resistant particles may be or comprise aluminum oxide. Having scratch particles at least in the uppermost wear resistant layer may decrease the risk of deep scratches in the top surface.

In an embodiment, the method further comprising applying a decorative layer between the substrate and the wear resistant layer before adhering at least the substrate and the foils together by means of heat and pressure.

The decorative layer of the building panel may be a colored powder layer, a paper sheet, a polymer-based sheet, a wood-based sheet, a wood veneer, a cork-based sheet, or a fabric, woven or non-woven. The decorative layer may further be a printed layer, such as a printed polymer-based sheet or a printed layer above the substrate.

In an embodiment the step of adhering the substrate and the foils together by means of heat and pressure for forming the building panel is achieved by a combined heat and pressure process, preferably a lamination process. The lamination process may either be one or several static processes or continuous processes, such as calendaring processes.

Further, the adhering of at least the substrate and the wear resistant sheet for forming the building panel may be made in one single step.

The step of adhering at least the substrate and the wear resistant sheet may be made with temperatures between 50-300° C., such as 50-220° C., such as 75 and 180° C. and with pressure between 1-100 bar, such as 1-50 bar, such as 1-30 bar, for a time period of 3-500 seconds, such as 5-300 seconds, such as 5-100 seconds.

In an embodiment the adhering of at least the substrate and the wear resistant sheet may be made in a process where heat and pressure are applied separately.

Alternatively, the adhering of at least the substrate and the wear resistant sheet may be made in a process where heat and pressure are applied, at least momentarily, simultaneously. The time for when the heat and pressure are applied simultaneously may be as short as 0.1 sec.

The step of adhering at least the substrate and the wear resistant sheet together may further comprise cooling the building panel.

The step of adhering at least the substrate and the wear resistant sheet may further comprise cooling the building panel before the pressure is released from the building panel.

In another embodiment, the adhering of at least the substrate and the wear resistant sheet may be made in a static press, e.g. a Multidaylight press. The time period for such a static press may be much longer than the examples above, e.g. 10-20 min. or more. If such a static press is used the adhering process may further include a cooling process.

In an embodiment the substrate comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In an embodiment the substrate may be foamed.

Further, the substrate may be a single layer substrate or a multi-layer substrate.

In a fifth aspect of the present inventive concept there is provided a wear resistant sheet, comprising:

a first foil comprising a thermoplastic material,
a second foil comprising a thermoplastic material,
a third foil comprising a thermoplastic material,
a wear resistant layer comprising wear resistant particles arrange between the first foil and the second foil, and
a wear resistant layer comprising wear resistant particles arranged between the second foil and the third foil.

In an embodiment of the present inventive concept each wear resistant layer comprise an amount of at least 99 wt % of the wear resistant particles, or at least 99.5 wt % of the wear resistant particles.

In an embodiment the wear resistant particles are chosen from aluminum oxide, quartz, diamond, diamond dust, boron nitride, almandine, glass, glass spheres, feldspar, silicon carbide, boron carbide, granite or a combination of such.

In an embodiment the wear resistant particles is aluminum oxide particles.

In another embodiment the wear resistant particles arranged between the first foil and the second foil are enclosed therein, at least in a direction essentially parallel to the thickness of the foils, and the wear resistant particles arranged between the second foil and the third foil are enclosed therein, at least in a direction essentially parallel to the thickness of the foils. The wear resistant particles arranged between the first foil and the second foil may be fixedly enclosed therein, and the wear resistant particles arranged between the second foil and the third foil may be fixedly enclosed therein. Fixedly enclosed means that the wear resistant particles are not able to move or detach from the foils after the manufacturing process.

Alternatively, none of the wear resistant particles arranged between the second foil and the third foil protrudes from the third foil.

The wear resistant particles may have grain sizes mainly, i.e. at least 94% of the wear resistant particles, within 53 to 102 μm, which may correspond to a grit size of 180 according to the well-known FEPA standard.

In an embodiment the wear resistant layer, arranged between the first foil and the second foil, is applied at an amount of 5-30 g/m$^2$, 7.5-25 g/m$^2$, or 10-20 g/m$^2$.

Further, the wear resistant layer, arranged between the second foil and the third foil, may be applied at an amount of 5-30 g/m$^2$, 7.5-25 g/m$^2$, or 10-20 g/m$^2$.

In a preferred embodiment the amount of wear resistant layer between the first and second foil and between the second and third foil is substantially equal.

Further, the total amount of the wear resistant layers arranged between the first foil and the second foil and between the second foil and the third foil, may be 10-60 g/m$^2$, 15-50 g/m$^2$, or 20-40 g/m$^2$.

In an embodiment the first foil the second foil and/or the third foil comprises any one of polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The foils may comprise at least 50 wt. % of the thermoplastic material, at least 60 wt. % of the thermoplastic material or at least 70 wt. % of the thermoplastic material.

The first foil, the second foil and the third foil each may have a thickness of 20-500 μm, or 50-200 μm. Alternatively, the first foil, the second foil and the third foil may have a thickness of at least 20 μm or at least 50 μm.

The thickness of each foil are in an embodiment the same. Alternatively, the thickness of the foils may be different.

The wear resistant particles may have an average particle size being less than the thickness of the uppermost foil, in this embodiment it is the third foil. The wear resistant particles may have an average particle size being larger than the thickness of the third foil. However, during pressing, the wear resistant particles are pressed into the first and second foil such that the wear resistant particles do not protrude beyond an upper surface of the third foil after pressing, although the wear resistant particles having an average particle size exceeding the thickness of the third foil.

The ratio between the size of the wear resistant particles and the thickness of the uppermost foil may be less than 1.5:1.

The ratio between the size of the wear resistant particles and the thickness of the first foil may be less than 1.5:1.

The ratio between the size of the wear resistant particles and the thickness of the second foil may be less than 1.5:1.

The ratio between the size of the wear resistant particles and the thickness of the third foil may be less than 1.5:1.

The ratio between the size of the wear resistant particles and the thickness of the any foil may be less than 1.5:1.

The wear resistant sheet may further comprise scratch resistant particles in the uppermost wear resistant layer, which in an embodiment is between the second and the third foil. The scratch resistant particles may be or comprise nano-sized silica particles, preferably fused silica particles. The scratch resistant particles may be or comprise aluminum oxide. Having scratch particles at least in the uppermost wear resistant layer may decrease the risk of deep scratches in the top surface.

In a sixth aspect of the present inventive concept there is provided a building panel, comprising:

a substrate, and a wear resistant sheet according to any of the embodiments presented above, arranged above the substrate.

In an embodiment the substrate comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In an embodiment the substrate may be foamed.

In another embodiment the building panel further comprises a decorative layer arranged between the substrate and the wear resistant sheet.

The decorative layer of the building panel may be a colored powder layer, a paper sheet, a polymer-based sheet, a wood-based sheet, a wood veneer, a cork-based sheet, or a fabric, woven or non-woven. The decorative layer may further be a printed layer, such as a printed polymer-based sheet or a printed layer above the substrate.

In a seventh aspect of the present inventive concept there is provided a building panel, comprising:

a substrate, a first foil comprising a thermoplastic material, arranged above the substrate, a second foil comprising a thermoplastic material, arranged above the first foil, a wear resistant layer comprising wear resistant particles arrange between the substrate and the first foil, and a wear resistant layer comprising wear resistant particles arranged between the first foil and the second foil.

In an embodiment of the present inventive concept each wear resistant layer comprise an amount of at least 99 wt. % of the wear resistant particles, or at least 99.5 wt. % of the wear resistant particles.

In an embodiment the wear resistant particles are chosen from aluminum oxide, quartz, diamond, diamond dust, boron nitride, almandine, glass, glass spheres, feldspar, silicon carbide, boron carbide, granite or a combination of such.

In an embodiment the wear resistant particles is aluminum oxide particles.

In another embodiment the wear resistant particles arranged between the substrate and the first foil are enclosed therein, at least in a direction essentially parallel to the thickness of the foils or in a direction essentially perpendicular to the longitudinal extension of the foils, and the wear resistant particles arranged between the first foil and the second foil are enclosed therein, at least in a direction essentially parallel to the thickness of the foils or in a direction essentially perpendicular to the longitudinal extension of the foils. The wear resistant particles arranged between the substrate and the first foil may be fixedly enclosed therein, and the wear resistant particles arranged between the first foil and the second foil may be fixedly enclosed therein. Fixedly enclosed means that the wear resistant particles are not able to move or detach from the foils after the manufacturing process.

Alternatively, none of the wear resistant particles arranged between the first foil and the second foil protrudes from the second foil.

The wear resistant particles may have grain sizes mainly, i.e. at least 94% of the wear resistant particles, within 53 to 102 μm, which may correspond to a grit size of 180 according to the well-known FEPA standard.

In an embodiment the wear resistant layer, arranged between the substrate and the first foil, is applied at an amount of 5-30 g/m², 7.5-25 g/m², or 10-20 g/m².

Further, the wear resistant layer, arranged between the first foil and the second foil, may be applied at an amount of 5-30 g/m², 7.5-25 g/m², or 10-20 g/m².

In a preferred embodiment the amount of wear resistant layer between the substrate and the first foil and between the first and second foil is substantially equal.

Further, the total amount of the wear resistant layers arranged between the substrate and the first foil and between the first foil and the second foil, may be 10-60 g/m², 15-50 g/m², or 20-40 g/m².

In an embodiment the first foil and/or the second foil comprises any one of polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The foils may comprise at least 50 wt. % of the thermoplastic material, at least 60 wt. % of the thermoplastic material or at least 70 wt. % of the thermoplastic material.

The first foil and the second foil each may have a thickness of 20-500 μm, or 50-200 μm. Alternatively, the first foil and the second foil may have a thickness of at least 20 μm. or at least 50 μm.

The thickness of each foil are in an embodiment the same. Alternatively, the thickness of the foils may be different.

The wear resistant particles may have an average particle size being less than the thickness of the uppermost foil, in this embodiment it is the second foil. The wear resistant particles may have an average particle size being larger than the thickness of the second foil. However, during pressing, the wear resistant particles may be pressed into the substrate and the first foil such that the wear resistant particles do not protrude beyond an upper surface of the second foil after pressing, although the wear resistant particles having an average particle size exceeding the thickness of the second foil.

The ratio between the size of the wear resistant particles and the thickness of the uppermost foil may be less than 1.5:1.

The ratio between the size of the wear resistant particles and the thickness of the first foil may be less than 1.5:1.

The ratio between the size of the wear resistant particles and the thickness of the second foil may be less than 1.5:1.

The ratio between the size of the wear resistant particles and the thickness of the any foil may be less than 1.5:1.

The building panel may further comprise scratch resistant particles in the uppermost wear resistant layer, which in an embodiment is between the first and the second foil. The scratch resistant particles may be or comprise nano-sized silica particles, preferably fused silica particles. The scratch resistant particles may be or comprise aluminum oxide. Having scratch particles at least in the uppermost wear resistant layer may decrease the risk of deep scratches in the top surface. In an embodiment the substrate comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In an embodiment the substrate may be foamed.

In another embodiment the building panel further comprises a decorative layer arranged between the substrate and the wear resistant layer.

The decorative layer of the building panel may be a colored powder layer, a paper sheet, a polymer-based sheet, a wood-based sheet, a wood veneer, a cork-based sheet, or a fabric, woven or non-woven. The decorative layer may further be a printed layer, such as a printed polymer-based sheet or a printed layer above the substrate.

BRIEF DESCRIPTION OF THE DRAWINGS

Embodiments of the inventive concept will be described in the following: reference being made to the appended drawings which illustrate non-limiting embodiments of how the inventive concept can be reduced into practice.

FIG. 1 is a schematic illustration of a method to produce a wear resistant sheet according to an embodiment of the present inventive concept, FIGS. 2A and 2B are schematic illustrations of a method to produce a wear resistant sheet according to another embodiment of the present inventive concept.

DETAILED DESCRIPTION OF EMBODIMENTS

Figure 3:
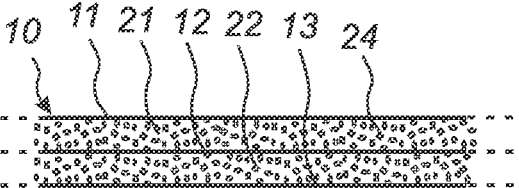
FIG. 3 is a schematically illustrated side view of a cross section of a wear resistant sheet according to an embodiment of the present inventive concept.

Specific embodiments of the inventive concept will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally, in this disclosure, terms like "below" or "lower" typically implies closer to the back surface of the panel or a plane thereof, whereas "above" or "upper" implies closer to the front surface or a plane thereof. Further, the thickness direction of the panel is defined as the vertical direction when the panel lays flat on a surface. The horizontal and vertical direction are applicable definition when the building panel is lays flat on e.g. a floor. Instead of horizontal and vertical directions, the description will also refer to a direction parallel with extension of the decorative surface and a direction perpendicular to the extension of the decorative surface. When a building panel is lays flat on e.g. a floor, the horizontal direction is the same as the direction parallel with the extension of the decorative surface and the vertical direction is the same as the direction perpendicular to the extension of the decorative surface.

With reference to the drawings, methods of producing wear resistant sheets 10 and building panels 1 and also such wear resistant sheets 10 and building panels 1 are illustrated. The wear resistant sheet 10 is a sheet suitably for e.g. a building panel 1. Such a building panel 1 may be a floor panel, a wall panel, a furniture component or similar.

FIG. 1 illustrates a first possible method to produce a wear resistant sheet 10. The method comprising:

providing a first foil 11,
  applying a first wear resistant layer 21 on the first foil 11
  applying a second foil 12 above the first foil 11,
  applying a second wear resistant layer 22 on the second foil 12,
  applying a third foil 13 above the second foil 12, and
  adhering the first foil 11, the second foil 12 and the third foil 13 together by means of heat and pressure for forming the wear resistant sheet 10. The first and second wear resistant layer 21, 22 are provided between the first and second foil 11, 12 respective between the second and third foil 12, 13.

As illustrated in the figures, the first and second wear resistant layers 21, 22 are scattered onto respective foil 11, 12 by a scattering device 31, 32. The wear resistant layers may be powder layers, such as loose powder layers. However, the wear resistant layers may be applied in powder form, in fluid form, as a paste, as a sheet, or as a mix with e.g. an adhesive.

Further, the wear resistant layer may be applied by scattering, by rolling or by any other suitable application method.

As illustrated in the figures the first wear resistant layer 21 is applied onto a surface of the first foil 11 before the second foil 12 is applied above the first foil 11, where the surface of the first foil 11 faces the second foil 12 after the second foil 12 has been applied above the first foil 11. However, in alternative embodiments the first wear resistant 21 layer may be applied to a surface of the second foil 12 before it is applied above the first foil 11, where the surface of the second foil 12 faces the first foil 11 after the second foil 12 has been applied above the first foil 11.

Further, the second wear resistant layer 22 is illustrated as being applied onto a surface of the second foil 12 before the third foil 13 is applied above the second foil 12, where the surface of the second foil 12 faces the third foil 13 after the third foil 13 has been applied above the second foil 12. However, in alternative embodiments the second wear resistant layer 22 may be applied to a surface of the third foil 13 before it is applied above the second foil 12, where the surface of the third foil 13 faces the second foil 12 after the third foil 13 has been applied above the second foil 12.

In yet another alternative embodiment several foils are pre-scattered with a wear resistant layer. The pre-scattered foils are then applied above each other, in as many layers as desirable, for example, any of 4-10 layers of foil.

Even though the figures mostly illustrate embodiments where a wear resistant sheet comprises three foils and two wear resistant layers it is possible and sometimes desirable to have more foils and wear resistant layers forming such a wear resistant sheet. The illustrated method steps of scattering a wear resistant layers and applying a foil are then repeated as many time as desirable, for example, to apply any of 4-10 layers of foil.

The wear resistant particles of the wear resistant layer 21 arranged between the first foil 11 and the second foil 12 are enclosed therein, at least in a direction essentially parallel to the thickness of the foils 11, 12 or in a direction essentially perpendicular to the longitudinal extension of the foils, after the foils 11, 12 are adhered together. The same applies for the wear resistant particles of the wear resistant layer 22 arranged between the second foil 12 and the third foil 13 which are enclosed therein, at least in a direction essentially parallel to the thickness of the foils 12, 13 or in a direction essentially perpendicular to the longitudinal extension of the foils, after the foils 12, 13 are adhered together. In the manufacturing process the press plate is preferably a flat press plate with no structure, which during pressing does not allow wear resistant particles to protrude above the uppermost surface of the uppermost foil, i.e. the uppermost surface of the uppermost foil becomes flat after pressing, with no bumpiness in the uppermost surface.

The first wear resistant layer 21, applied between the first foil 11 and the second foil 12, is applied at an amount of 5-30 $g/m^2$, preferably at an amount of 7.5-25 $g/m^2$, or even more preferably at an amount of 10-20 $g/m^2$. The second wear resistant layer 22, applied between the second foil 12 and the third foil 13, is applied at an amount of 5-30 $g/m^2$, preferably at an amount of 7.5-25 $g/m^2$, or even more preferably at an amount of 10-20 $g/m^2$. The amount of wear resistant layer 21, 22 between the first and second foil 11, 12 respective between the second and third foil 12, 13 is preferably substantially equal. However, in other embodiments it may be preferred to have different amounts of wear resistant layers forming the wear resistant sheet 10. For example, the top wear resistant layer may include between 50% and 75% of the total amount of wear resistant layer compared to the other layer/layers.

The total amount of the wear resistant layers 21, 22 applied, between the foils 11, 12, 13 of the wear resistant sheet 10 is 10-60 $g/m^2$, preferably 15-50 $g/m^2$, or even more preferably 20-40 $g/m^2$.

Each wear resistant layer 21, 22 comprises wear resistant particles 24. The wear resistant particles may be aluminum oxide particles ($AlO_3$). Each wear resistant layer 21, 22 comprises an amount of at least 99 wt. % of the wear resistant particles, or at least 99.5 wt. % of the wear resistant particles. The remaining amount of the wear resistant layer may comprise e.g. stabilizers, binder or different product enhancement for improved processability and usability.

In an embodiment, the wear resistant layer is not a glass fiber layer, or a glass grid layer, or a glass sail layer. In an embodiment, the wear resistant layer is not a nonwoven fiber layer.

The wear resistant particles 24 arranged between the first foil 11 and the second foil 12 are enclosed therein, at least in a direction essentially parallel to the thickness of the foils, and preferably even fixedly enclosed therein, after the foils 11, 12 are adhered together. Fixedly enclosed means that the wear resistant particles are not able to move or detach from the foils 11, 12 after the manufacturing process.

Further, the wear resistant particles 24 arranged between the second foil 12 and the third foil 13 are enclosed therein, at least in a direction essentially parallel to the thickness of the foils, and preferably even fixedly enclosed therein, after the foils 12, 13 are adhered together. Fixedly enclosed means that the wear resistant particles are not able to move or detach from the foils 12, 13 after the manufacturing process. By being enclosed therein, none of the wear resistant particles 24 arranged at least between the second foil 12 and the third foil 13 protrudes from the third foil 13 after adhering the foils 12, 13 together, more specifically none of the wear resistant particles 24 protrudes from an upper surface of the third foil 13, where the upper surface of the third foil 13 face away from the second foil 12 after the foils 12, 13 are adhered together. As explained above, in the manufacturing process the press plate is preferably a flat press plate with no structure, which during pressing does not allow wear resistant particles to protrude above the uppermost surface of the uppermost foil, i.e. the uppermost surface of the uppermost foil becomes flat after pressing, with no bumpiness in the uppermost surface.

Each foil 11, 12, 13 of the wear resistant sheet comprises a thermoplastic material chosen from one or several of polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The first foil 11, the second foil 12 and the third foil 13 each have a preferred thickness of 20-300 μm., or 50-200 μm. It is possible to have even thicker foils but preferred ranges for the application of the wear resistant sheet 10 described herein is as defined above. The foils 11, 12, 13 forming the wear resistant sheet 10 may have the same or different thickness. For example, it may be preferred, e.g., for building panels assembled, as e.g., a floor, in a home environment that the top foil may be thinner, e.g. 50% thinner, compared to the below arranged foils, since it may increase the visual appearance and the décor of the building panel. Another example is, that it may be preferred, e.g., for building panels assembled, as e.g. a floor, in a public and commercial environment that the top foil may be thicker, e.g. 50% thicker compared to the below arranged foils, since it may increase the wear resistance and surface resistance of the building panel.

The method step of adhering the foils together by means of heat and pressure may be made by a combined pressing and heating process 34 or a process where pressure and heat are separated. The method step of adhering the foils together is preferably made by a lamination or pre-lamination process, which may either be a static process or a continuous process. An example of a static process may be a Multidaylight press, and an example of a continuous process may be a calendaring process having calendaring rolls, each laminating the foils together. Further, the heating part of such process 34 may be achieved by a singular heating device, heating from one direction, or a double heating device, heating from two opposite directions.

The step of adhering the foils together may be made with temperatures between 50-300° C., such as 50-220° C., such as 75 and 180° C. and with pressure between 1-100 bar, such as 1-50 bar, such as 1-30 bar, for a time period of 3-500 seconds, such as 5-300 seconds, such as 5-100 seconds. If the step of adhering the foils together is achieved by a continuous lamination process a possible process speed may be 1-50 m/min, or 2-30 m/min.

The method step of adhering the foils together may be a type of pre-lamination, i.e. where the wear resistant sheet is not completely laminated together and where the pre-lamination is defined by a lower pressure, lower temperature, shorter process time compared to the main lamination process in which a wear resistant sheet and/or a building panel may be manufactured. The purpose of such a pre-lamination is to lock in the particles to the foils without achieving complete lamination of the foils in order to simplify the handling of the wear resistant sheet for the later main lamination process. The complete lamination of the wear resistant sheet may then be performed during a subsequent lamination, where the wear resistant sheet is applied on e.g. a substrate and laminated together to form a building panel. Such a subsequent lamination and method to form a building panel is presented below.

FIGS. 2A and 2B illustrate an alternative embodiment of a method of producing a wear resistant sheet 10 were the steps in FIG. 2B is a continuation of what is illustrated in FIG. 2A. All features and properties of the foils 11, 12, 13 and wear resistant layers 21, 22 described above is also applicable for this alternative embodiment. The difference between the embodiment illustrated in FIG. 1 and FIGS. 2A and 2B is that there is an additional adhering step in between applying the second foil 12 and scattering the second wear resistant layer 22. I.e. the method illustrated in FIGS. 2A and 2B comprises:

providing a first foil 11,
    applying a first wear resistant layer 21 on the first foil 11
    applying a second foil 12 above the first foil 11,
    adhering the first foil 11 and the second foil 12 together by means of heat and pressure,
    applying a second wear resistant layer 22 on the second foil 12,
    applying a third foil 13 above the second foil 12, and
    adhering the third foil 13 to the second foil 12 by means of heat and pressure for forming the wear resistant sheet 10. The first and second wear resistant layer 21, 22 are provided between the first and second foil 11, 12 respective between the second and third foil 12, 13.

The method step of adhering the foils together by means of heat and pressure may be made by one or several combined pressing and heating processes 34, 34b or processes where pressure and heat are separated. The method step of adhering the foils together is preferably made by one or several lamination or pre-lamination processes, which may either be a static process or a continuous processes. An example of a static process may be a Multidaylight press, and an example of a continuous process may be a calendaring process having calendaring rolls, each laminating the foils together. Further, the heating part of such processes 34a, 34b may be achieved by a singular heating device, heating from one direction, or a double heating device, heating from two opposite directions.

The step of adhering the foils together may be made with temperatures between 50-300° C., such as 50-220° C., such as 75 and 180° C. and with pressure between 1-100 bar, such as 1-50 bar, such as 1-30 bar, for a time period of 3-500 seconds, such as 5-300 seconds, such as 5-100 seconds. If the step of adhering the foils together is achieved by a continuous lamination process a possible process speed may be 1-50 m/min, or 2-30 m/min.

The method step of adhering the foils together may be a type of pre-lamination where the wear resistant sheet is not completely laminated together. The complete lamination of the wear resistant sheet may then be performed during a subsequent lamination, where the wear resistant sheet is applied on e.g. a substrate and laminated together to form a building panel. Such a subsequent lamination and method to form a building panel is presented below.

FIG. 3 is a detailed schematical illustration of a wear resistant sheet 10 e.g. produced by any of the methods previously described. The wear resistant sheet 10 includes three foils 11, 12, 13 and two wear resistant layers 21, 22. Each wear resistant layer 21, 22 is encapsulated by the two foils 11, 12, 13 between which it is arranged. Each wear resistant layer 21, 22 include the wear resistant particles 24. In an embodiment, the wear resistant particles 24 are fully enclosed by the foils 11, 12, 13, at least in a direction essentially parallel to the thickness of the foils. In an embodiment, the wear resistant particles are fully enclosed, and preferably fixedly enclosed, by the foils 11 and 13. Fixedly enclosed means that the wear resistant particles are not able to move or detach from the foils 12, 13 after the manufacturing process. Preferably, none of the wear resistant particles 24 protrude from either one of the two outer foils, the first foil 11 and the third foil 13. Thus, the wear resistant sheet 10 may be arranged on a substrate 3 of a building panel 1 with either the first foil 11 or the third foil 13 facing the substrate 3. As explained above, in the manufacturing process the press plate is preferably a flat press plate with no structure, which during pressing does not allow wear resistant particles to protrude above the uppermost surface of the uppermost foil, i.e. the uppermost surface of the uppermost foil becomes flat after pressing, with no bumpiness in the uppermost surface.

As described above, the amount of wear resistant layer 21, 22 between the first and second foil 11, 12 respective between the second and third foil 12, 13 is preferably substantially equal. However, in other embodiments it may be preferred to have different amounts of wear resistant layers forming the wear resistant sheet 10.

Even though the figures mostly illustrate embodiments where a wear resistant sheet 10 comprises three foils and two wear resistant layers it is possible and sometimes desirable to have even more foils and wear resistant layers forming such a wear resistant sheet.

Figure 4:
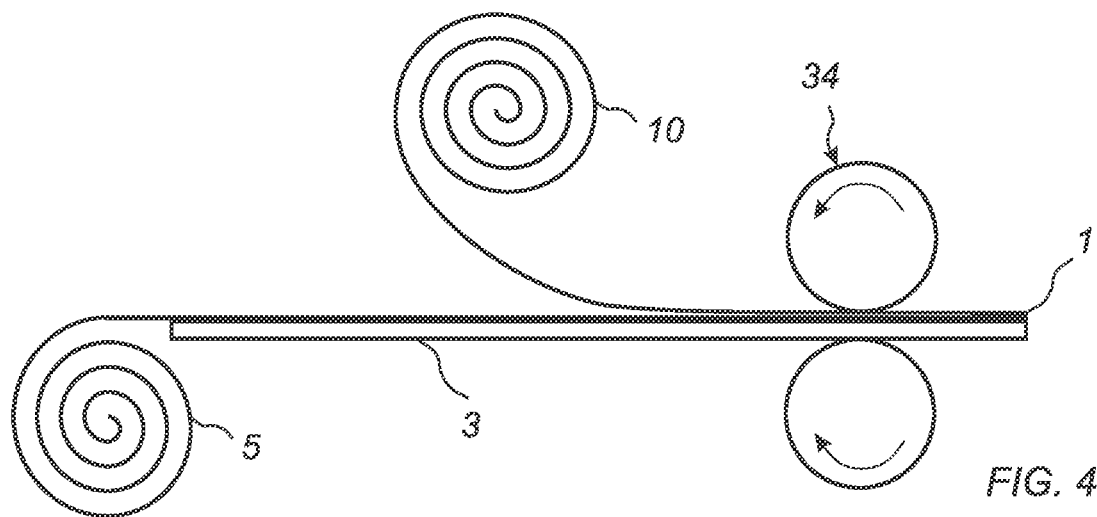
FIG. 4 is a schematic illustration of a method to produce a building panel according to an embodiment of the present inventive concept.
Figure 5:
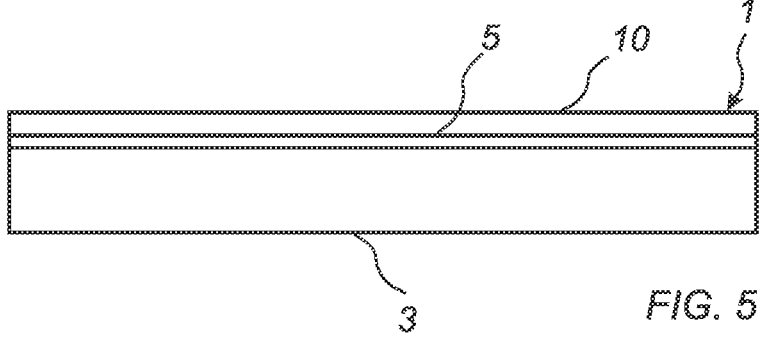
FIG. 5 is a schematically illustrated side view of a cross section of a building panel according to an embodiment of the present inventive concept.

FIG. 4 illustrates a method for producing a building panel 1 with such a wear resistant sheet 10 and the building panel 1 is schematically illustrated in FIG. 5. The method comprising:

providing a substrate 3,
    applying a decorative layer 5,
    applying a wear resistant sheet 10, and
    adhering the substrate 3, the decorative layer 5, and the wear resistant sheet 10, by means of heat and pressure, for forming the building panel 1.

The substrate 3 may be a single layer substrate or a multi-layered substrate. Further, the substrate 3 may comprise a polymer-based material, where the polymer-based material may be a thermoplastic material. The thermoplastic material may be chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof. The substrate 3 may comprise an amount of at least 10 wt. %, at least 15 wt. % or at least 20 wt. % of the thermoplastic material. The substrate 3 may comprise an amount of 10-60 wt. %, 15-50 wt. %, or 20-30 wt. % of a thermoplastic material.

A substrate 3 based on a thermoplastic material may include 30-90 wt. %, 40-85 wt. % or 50-80 wt. % of a filler. The filler may be an organic filler or an inorganic filler.

It is also possible for the substrate 3 to comprise thermoset material such as epoxy, polyurethane, cross-linked polyethylene (PEX), amino plastics, phenolic plastics, acrylates and/or a combination thereof. A substrate 3 based on a thermoset material may include 10-70 wt. %, 20-60 wt. % or 25-50 wt. % of a thermoset resin, such as amino plastics, polyurethanes, phenoplastics, epoxy or acrylics.

A substrate 3 based on a thermoset material may further include 1-70 wt. %, 10-70 wt. % or 20-70 wt. % of a filler. The filler may be an organic filler or an inorganic filler.

If may further be possible for the substrate 3 to comprise a mineral based material, such as magnesium oxide (MgO), magnesium chloride (MgCl2), magnesium sulfate (MgSO4), or sand. A substrate 3 based on a mineral based material may include at least 50 wt. %, at least 60 wt. %, at least 70 wt. %, or at least 80 wt. % of the mineral based material. A substrate 3 based on these types of mineral materials may further include 1-20 wt. % or 5-15 wt. % filler, an organic or inorganic. Another type of suitable mineral based material is e.g. Portland cement. A substrate material based on this type of mineral material may be called a fibre cement board, may further include sand and/or 1-20 wt. % or 5-15 wt. % filler.

The filler of the substrate 3 may comprise at least one or more of an organic filler, an inorganic filler, or a combination thereof. Examples of organic fillers are wood flour and rice husks. These types of organic fillers are often cost efficient and easy to get hold of. The substrate may comprise 1-70 wt. % organic filler, or 30-70 wt. % organic filler. Examples of inorganic fillers are calcium carbonate (CaCO3), barium sulphate (BaSO4), talc, and/or a combination thereof. These types of fillers are especially cost efficient and easy to get a hold of.

The substrate may further comprise a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. The substrate material forming the substrate may comprise a plasticizer of an amount of 1-30 wt. %, or 2-15 wt. %.

A typical SPC substrate which may be preferred to use for this type of application, may include 10-40 wt. %, 15-35 wt. %, or 20-30 wt. % of a thermoplastic material, such as PVC. The SPC substrate may further include 50-90 wt. %, 60-80 wt. % or 65-75 wt. % of an inorganic filler, such as chalk. The SPC substrate may further include 0-20 wt. %, 1-15 wt. % or 2-10 wt. % of additives, such as impact modifier, stabilizer, lubricant and/or pigment.

A typical LVT substrate, which also may be preferred to use for this type of application, would have a similar content of material as the SPC substrate above, i.e. 10-40 wt. %, 15-35 wt. %, or 20-30 wt. % of a thermoplastic material, 50-90 wt. %, 60-80 wt. % or 65-75 wt. % of an inorganic filler and 0-20 wt. %, 1-15 wt. % or 2-10 wt. % of additives, but with the addition of 1-20 wt. %, 2-15 wt. % or 3-10 wt. % of a plasticizer.

The decorative layer 5 of the building panel 1 may be a colored powder layer, a paper sheet, a polymer-based sheet, a wood-based sheet, a wood veneer, a cork-based sheet, or a fabric, woven or non-woven. The decorative 5 layer may further be a printed polymer-based sheet.

The wear resistant sheet 10 is substantially transparent such that the appearance of the decorative layer 5 is not affected when it is arranged below the wear resistant layer 10 in the finished building panel 1. A surprising advantage with the wear resistant sheet 10 as described above, having two or more wear resistant layers 21, 22, compared to a wear resistant sheet having the same amount of wear resistant particles but arranged in one single layer is that the opacity of the wear resistant sheet 10 is affected. Having the same amount of wear resistant particles 24 spread out between at least two wear resistant layers 21, 22 makes the wear resistant sheet less cloudy, i.e. more transparent, compared to having the same amount of wear resistant particles in one single wear resistant layer. This means that the appearance of the decorative layer 5 arranged underneath the wear resistant sheet 10 is improved by having two or more wear resistant layers 21, 22.

The method step of adhering the wear resistant sheet 10, the decorative layer 5 and the substrate 3 to form a building panel 1 by means of heat and pressure may be made by one or several combined pressing and heating processes 34 or one or several processes where pressure and heat are separated. The method step is preferably made by one or several lamination or pre-lamination processes, which may either be static processes or a continuous processes. An example of a static process may be a Multidaylight press, and an example of a continuous process may be a calendaring process having calendaring rolls, each laminating the foils together. Further, the heating part of such process 34 may be achieved by a singular heating device, heating from one direction, or a double heating device, heating from two opposite directions.

The step of adhering the wear resistant sheet 10, the decorative layer 5 and the substrate 3 to form a building panel 1 may be made with temperatures between 50-300° C., such as 50-220° C., such as 75 and 180° C. and with pressures between 1-100 bar, such as 1-50 bar, such as 1-30 bar, for a time period of 3-500 seconds, such as 5-300 seconds, such as 5-100 seconds. If the step of adhering the foils together is achieved by a continuous lamination process a possible process speed may be 1-50 m/min, or 2-30 m/min.

The method step of adhering the foils together to form the wear resistant sheet 10 may be a type of pre-lamination where the wear resistant sheet is not completely laminated together. The complete lamination of the wear resistant sheet may then be performed during a subsequent lamination, where the wear resistant sheet is applied on the substrate 3 and/or decorative layer 5 and laminated together to form the building panel.

Figure 6A:
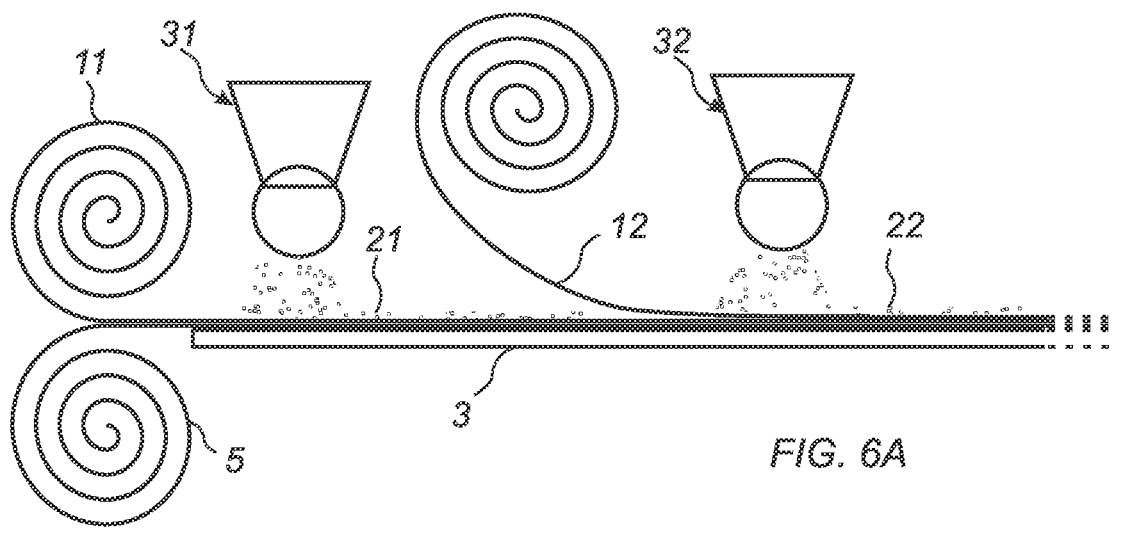
FIGS. 6A and 6B are schematic illustrations of a method to produce a building panel according to another embodiment of the present inventive concept.
Figure 6B:
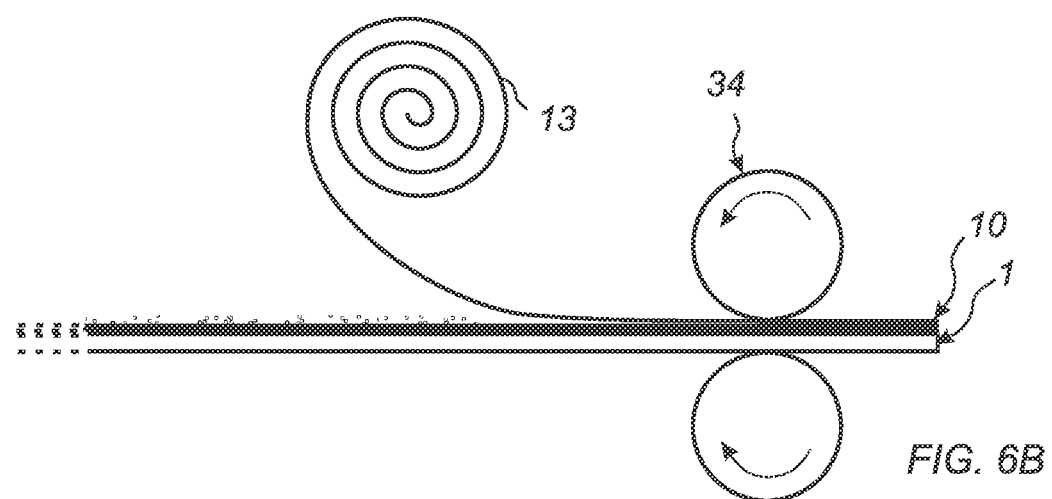

FIG. 4 illustrates a method where a finished wear resistant sheet 10 is arranged on a decorative layer 5 and a substrate 3 whereas FIGS. 6A and 6B schematically illustrate a method where the wear resistant sheet 10 is pressed simultaneously as forming the building panel 1. All features, properties and embodiments of the methods, the substrate 3, the decorative layer 5, the foils 11, 12, 13 and the wear resistant layers 21, 22 described above is also applicable for this alternative embodiment of a method to produce a building panel 1.

The method as illustrated in FIGS. 6A and 6B comprises:
providing a substrate 3,
applying a decorative layer 5 on the substrate 3,
applying a first foil 11 on the decorative layer 3,
applying a first wear resistant layer 21 on the first foil 11
applying a second foil 12 above the first foil 11,
applying a second wear resistant layer 22 on the second foil 12,
applying a third foil 13 above the second foil 12, and
adhering the first foil 11, the second foil 12, the third foil 13, the decorative layer 5 and the substrate 3 together by means of heat and pressure for forming the building panel 1. The first and second wear resistant layer 21, 22 are provided between the first and second foil 11, 12 respective between the second and third foil 12, 13.

The method step of adhering the foils 11, 12, 13, the wear resistant layers 21, 22, the decorative layer 5 and the substrate 3 to form a building panel 1 by means of heat and pressure may be made by one or several combined pressing and heating processes 34 or one or several processes where pressure and heat are separated. The method step is preferably made by one or several lamination or pre-lamination processes, which may either be static processes or a continuous processes. An example of a static process may be a Multidaylight press, and an example of a continuous process may be a calendaring process having calendaring rolls, each laminating the foils together. Further, the heating part of such process 34 may be achieved by a singular heating device, heating from one direction, or a double heating device, heating from two opposite directions.

The step of adhering the foils, 11, 12, 13, the wear resistant layers 21, 22, the decorative layer 5 and the substrate 3 to form a building panel 1 may be made with temperatures between 50-300° C., such as 50-220° ° C., such as 75 and 180° C. and with pressures between 1-100 bar, such as 1-50 bar, such as 1-30 bar, for a time period of 3-500 seconds, such as 5-300 seconds, such as 5-100 seconds. If the step of adhering the foils together is achieved by a continuous lamination process a possible process speed may be 1-50 m/min., or 2-30 m/min.

If several processes the method step of adhering the foils together may be a type of pre-lamination where the foils are not completely laminated together. The complete lamination of the wear resistant sheet may then be performed during the subsequent lamination, where the pre laminated wear resistant sheet is applied on the substrate 3 and/or decorative layer 5 and laminated together to form the building panel 1.

Figure 7:
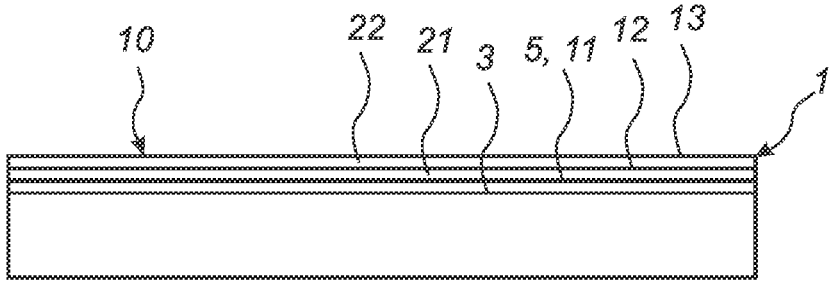
FIG. 7 is a schematically illustrated side view of a cross section of a building panel produced with the method in FIGS. 6A and 6B, FIGS. 8A and 8B are schematic illustrations of a method to produce a building panel according to yet another embodiment of the present inventive concept.

FIG. 7 is a schematic illustration of a building panel 1 produced by the method illustrated in FIGS. 6A and 6B.

Figures 8A, 8B, 9:
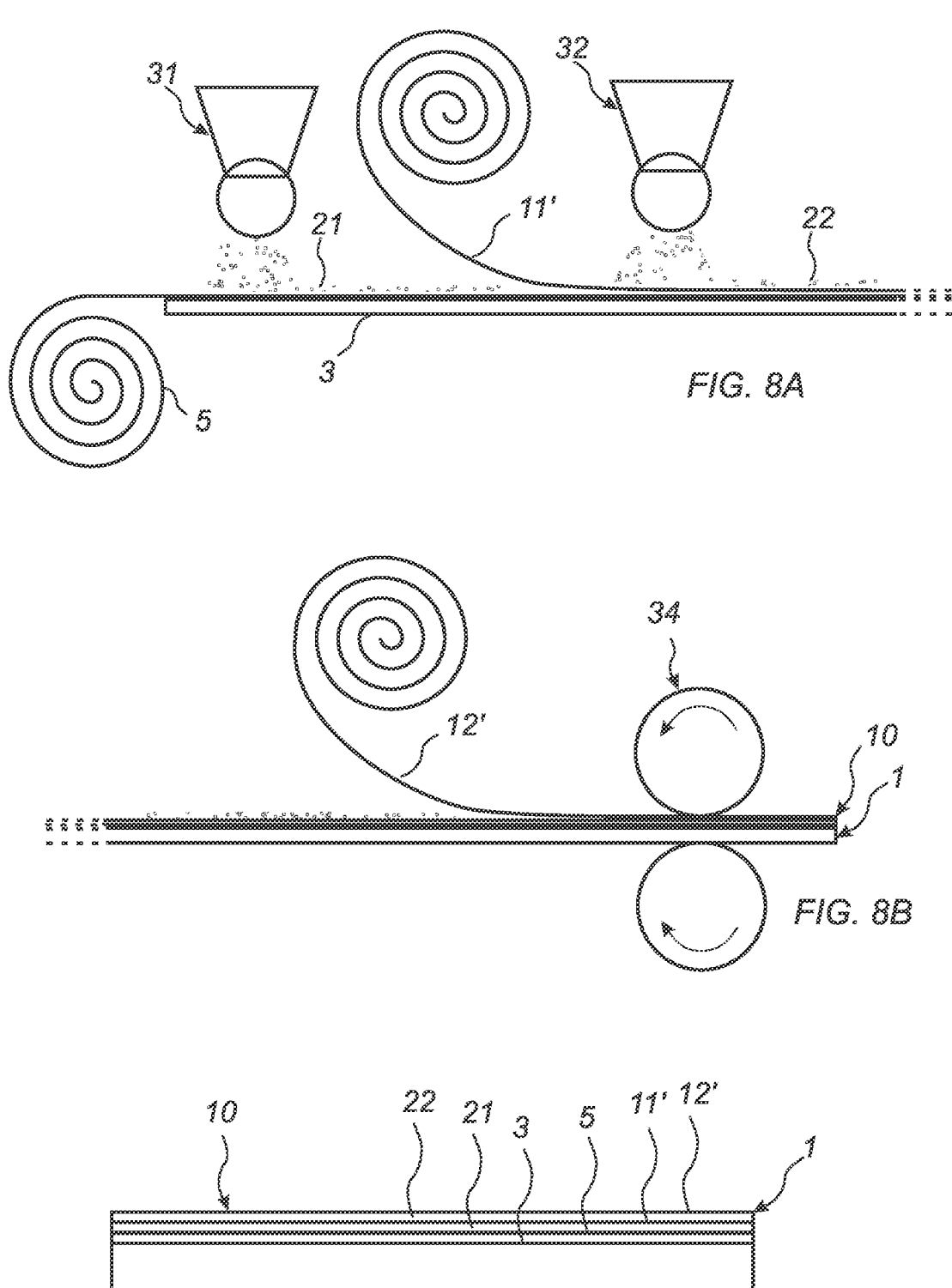
FIG. 9 is a schematically illustrated side view of a cross section of a building panel produced with the method in FIGS. 8A and 8B.

FIGS. 8A and 8B illustrate yet another embodiment of a method to produce a building panel 1 according to the inventive concept and FIG. 9 schematically illustrate such building panel 1. The difference from earlier described embodiments is that the first wear resistant layer 21 is applied, or scattered, directly onto the decorative layer 5 instead of a first foil. The first foil 11' of this embodiment is instead applied above the first wear resistant layer 21. Further, the second wear resistant layer 22 is then applied, or scattered, onto the first foil 11', and the second foil 12' is then applied above the second wear resistant layer 22. The second foil 12' will then form the top-most layer of the building panel 1, as illustrated in FIGS. 8A, 8B and 9. It is of course possible to apply even more foils and wear resistant layers to form a building panel suitable for specific applications, to have for example a total of any of 2-10 foil layers.

All features and properties of the substrate, the decorative layer, the foils, and the wear resistant layers described above is also applicable for this alternative embodiment.

Thus, the method as illustrated in FIGS. 8A and 8B comprises:
providing a substrate 3,
applying a first foil 11' above the substrate 3,
applying a second foil 12' above the first foil 11',
applying a wear resistant layer 21 on the substrate 3 and/or on the first foil 11' prior to applying the first foil 11' above the substrate 3,
applying a wear resistant layer 22 on the first foil 11' and/or on the second foil 12' prior to applying the second foil 12' on the first foil 11', and
adhering the substrate 3, the first foil 11' and the second foil 12' together, by means of heat and pressure for forming the building panel 1. The wear resistant layers 21, 22 are provided between the substrate 3 and the first foil 11' respective between the first foil 11' and the second foil 12'.

The method step of adhering the foils 11', 12' the wear resistant layers 21, 22, the decorative layer 5 and the substrate 3 to form a building panel 1 by means of heat and pressure may be made by one or several combined pressing and heating processes 34 or one or several processes where pressure and heat are separated. The method step is preferably made by one or several lamination or pre-lamination processes, which may either be static processes or a continuous processes. An example of a static process may be a Multidaylight press, and an example of a continuous process may be a calendaring process having calendaring rolls, each laminating the foils together. Further, the heating part of such process 34 may be achieved by a singular heating device, heating from one direction, or a double heating device, heating from two opposite directions.

The step of adhering the foils 11', 12', the wear resistant layer 21, 22, the decorative layer 5 and the substrate 3 to form a building panel 1 may be made with temperatures between 50-300° C., such as 50-220° C., such as 75 and 180° C. and with pressures between 1-100 bar, such as 1-50 bar, such as 1-30 bar, for a time period of 3-500 seconds, such as 5-300 seconds, such as 5-100 seconds. If the step of adhering the foils together is achieved by a continuous lamination process a possible process speed may be 1-50 m/min., or 2-30 m/min.

If several processes, the method step of adhering the foils together, which in this embodiment may be to adhere the first foil 11', the second foil 12' and the second wear resistant layer 22 together before applying it on the substrate 3 with the first wear resistant layer 21 and the possible decorative layer 5, may be a type of pre-lamination where the foils are not completely laminated together. The complete lamination of the foils forming the wear resistant sheet may then be performed during the subsequent lamination, where the pre-laminated wear resistant sheet, the substrate 3 and/or decorative layer 5 are laminated together to form the building panel 1.

Embodiments of the disclosure include a wear resistant sheet, such as a wear resistant sheet produced by any of the disclosed embodiments herein, where the wear resistant sheet has the abrasion resistant property of having at least 4000 revolutions, such as at least 4800, such as at least 4900, such as at least 5600, such as at least 5700, such as at least 5800, such as at least 6000, such as at least 6500, such as at least 7000, such as at least 7400, according to a wear test performed using a Taber Abraser according to standard EN13329:2016+A2:2021. For determining the abrasion resistant property, the wear resistant sheet may be on a substrate, such as on a substrate and a decorative layer. The substrate may be based on a thermoplastic material, such as a Luxury Vinyl Tiles (LVT), Stone Polymer Composite (SPC), Wood Polymer Composite (WPC) or Expanded Polymer Composite (EPC) substrates or similar. The decorative layer may be based on polyvinyl chloride (PVC), polypropylene (PP) or polyethylene (PE) or similar.

EXAMPLES

For the following samples a wear resistant sheet has been produced with the components:

Standard foils based on PVC with a PHR (Parts per hundred rubber) of 28, e.g. from Westlake®, Gislaved® or Intime®.

Wear resistant layer having at least 99 wt % of aluminum oxide particles.

For the reference samples, two foils, one with a thickness of 0.1 mm and one with a thickness of 0.2 mm, have been used. In between the foils there was applied one wear resistant layer of different amounts.

For the samples in accordance with the present inventive concept, three foils, each with the same thickness of 0.1 mm, have been used. In between the first foil and the second foil one wear resistant layer was applied and in between the second foil and the third foil one wear resistant layer was applied. The amount of the wear resistant layer arranged between the first layer and the second layer respective between the second layer and the third layer were equal, but the total amount of the wear resistant layers were different in each sample.

The foils and wear resistant layers in accordance with the reference samples respective the samples according to the present inventive concept, was arranged above a substrate, a substrate based on a thermoplastic material, before adding pressure and heat to form sample panels with different types of wear resistant sheets on top. Further, in between the substrate and the first foil of the wear resistant sheet there was a decorative layer arranged. The same type of decorative layer, with the same decorative pattern, was used for all the samples below.

The sample panels, with a substrate, a decorative layer and different wear resistant sheets, were then formed by applying heat and pressure for 60 sec. by a continuous pressing device. The temperature was 150° ° C. in the press plate of the pressing device and the pressure was 15 bar.

Two tests were performed on each sample, a wear test and a test of the appearance of the decorative layer after the sample panel was formed.

Test 1—the Wear Test

Figure 10:
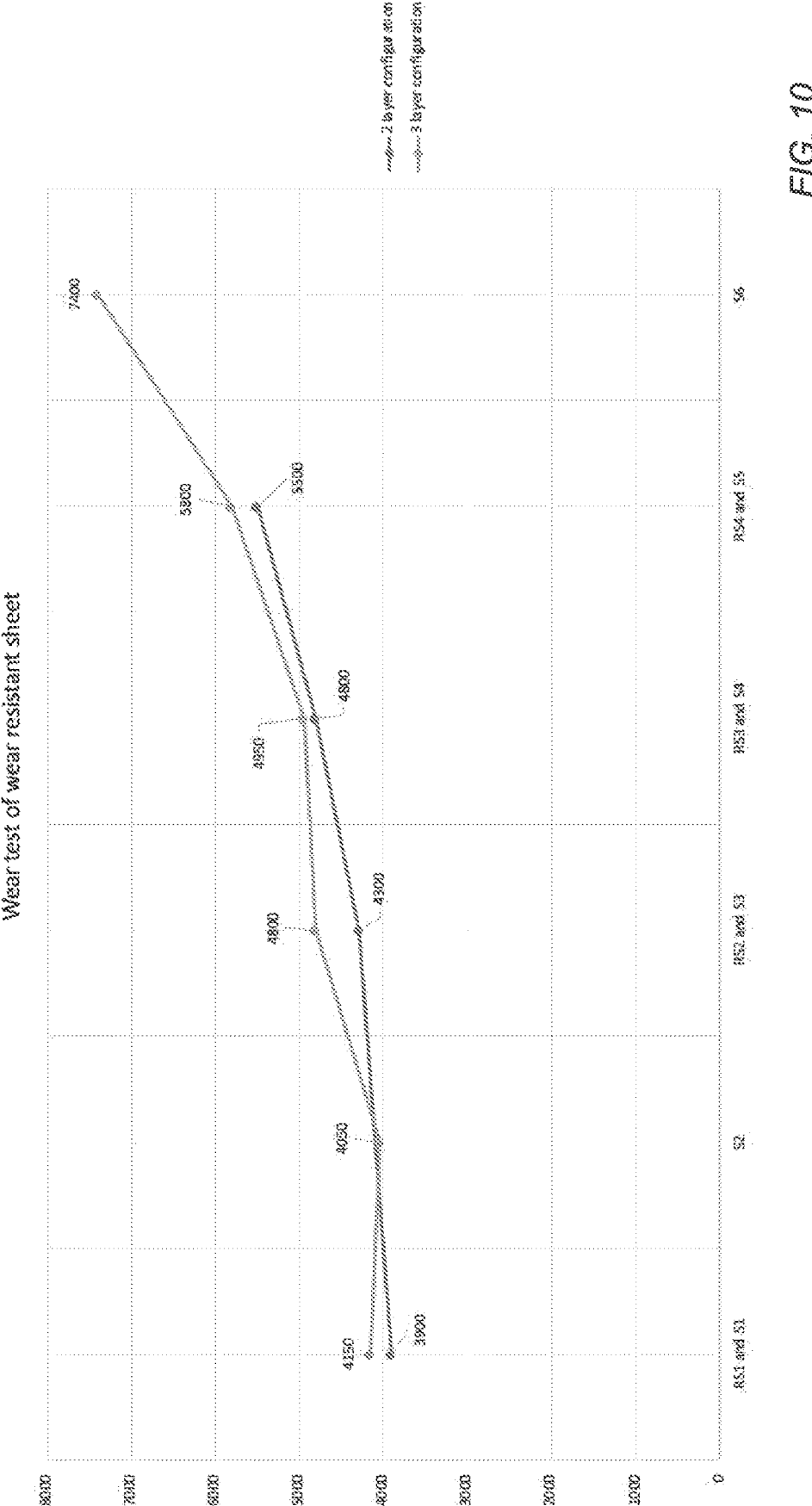
FIG. 10 is a diagram illustrating the results of a wear test.

The wear test was performed using a Taber Abraser according to standard EN13329:2016+A2:2021. Table 1 presents the result for the reference samples, i.e. the samples having a substrate, a decorative layer, two foils (F) and one wear resistant layer (WRL) in between the foils. Table 2 presents the result for the samples according to the present inventive concept, i.e. the samples having a substrate, a decorative layer, three foils and two wear resistant layers. A diagram comparing the results between the reference samples and the samples according to the inventive concept can be seen in FIG. 10.

TABLE 1

| Wear test - Reference samples | | |
|---|---|---|
| WEAR TEST - Reference samples | Sample construction with foil (F) and wear resistant layer (WRL) | Revolutions |
| RS1 | F of 0.1 mm + WRL of 10 g/m² + F of 0.2 mm | 3900 |
| RS2 | F of 0.1 mm + WRL of 20 g/m² + F of 0.2 mm | 4300 |
| RS3 | F of 0.1 mm + WRL of 30 g/m² + F of 0.2 mm | 4800 |
| RS4 | F of 0.1 mm + WRL of 40 g/m² + F of 0.2 mm | 5500 |

TABLE 2

| Wear test - Samples according to inventive concept | | |
| --- | --- | --- |
| WEAR TEST - Samples acc. to inventive concept | Sample construction with foil (F) and wear resistant layer (WRL) | Revolutions |
| S1 | F of 0.1 mm + WRL of 5 g/m² + F of 0.1 mm + WRL of 5 g/m² + F of 0.1 mm | 4150 |
| S2 | F of 0.1 mm + WRL of 7.5 g/m² + F of 0.1 mm + WRL of 7.5 g/m² + F of 0.1 | 4050 |
| S3 | F of 0.1 mm + WRL of 10 g/m² + F of 0.1 mm + WRL of 10 g/m² + F of 0.1 | 4800 |
| S4 | F of 0.1 mm + WRL of 15 g/m² + F of 0.1 mm + WRL of 15 g/m² + F of 0.1 | 4950 |
| S5 | F of 0.1 mm + WRL of 20 g/m² + F of 0.1 mm + WRL of 20 g/m² + F of 0.1 | 5800 |
| S6 | F of 0.1 mm + WRL of 25 g/m² + F of 0.1 mm + WRL of 25 g/m² + F of 0.1 | 7400 |

A conclusion of the above presented wear test is that the wear properties of a building panel does not significantly differ between having a wear resistant sheet with two foils and one wear resistant layer and a wear resistant sheet with three foils and two wear resistant layers. This conclusion was expected but important to prove.

Test 2—the Appearance Test

The appearance test was performed by viewing the sample, RS1-RS3 and S1-S5, from different angles, 10°, 30°, 45° and 90° in relation to a horizontal plane. Each sample was then rated based on a scale as presented in Table 3.

TABLE 3

| Appearance test - Rating definition | |
| --- | --- |
| Rating | Explanation |
| A | Optimum visual properties. The opacity and the color representation of the decorative layer is very vivid and clear. |
| B | OK result. The transparency is not as clear as rating A. The color representation of the decorative layer is also not as vivid and clear. |
| C | Undesirable result. The transparency is becoming more matte. The color representation of the decorative layer is also less vivid than rating B and more so A. Also less sharp and blurry. |

The color representation is defined by the decorative layer. The rating is set on how the decorative layer appears when looking at the sample from a viewer's perspective, at different angles, as described above. The difference in ratings depends on how the decorative layer, the colors and the pattern appears to a viewer, preferably simulating how the viewer perceives the building panel when installed, e.g. as a flooring, a wall panel, or a part of a furniture. The reference samples, RS1-RS3, are compared to the samples according to the present inventive concept, S1-S5. It is especially interesting to compare the different samples having the same total amount of wear resistant layer, i.e. comparing RS1 with S1, RS2 with S3, RS3 with S4 and RS4 with S5. The ratings of each sample can be seen in Table 4 below.

TABLE 4

| Rating of samples | |
| --- | --- |
| APPEARANCE TEST - Samples | Rating |
| RS1 | B |
| RS2 | B |
| RS3 | B |
| RS4 | C |
| S1 | A |
| S2 | A |
| S3 | A |
| S4 | A |
| S5 | B |
| S6 | B |

The appearance test gave some surprising results when comparing the reference samples with the samples according to the inventive concept. The results tell us that having an amount of wear resistant layer split between two layer instead of one affects the appearance of the decorative layer less. One possible explanation to the surprising effect may be that fewer clusters, or smaller clusters of wear resistant particles are formed when the amount of wear resistant layer is split between two layers. Another possible explanation to the surprising effect may be that, due to the amount of wear resistant particles being arranged in at least two separated layers between the foils, the concentration of wear resistant particles in each layer is decreased, creating more openings between the particles, i.e. the wear resistant particles are more spread out, in turn allowing an increased light transmission to the decorative layer, which contributes to more optimum visual properties.

A conclusion from the tests above may be that having a building panel with several wear resistant layers and more foils, where each wear resistant layer is arranged between two foils, has benefits when it comes to the appearance of the decorative layer of the building panel and how a viewer perceives the building panel without compromising the wear resistant properties of the wear resistant sheet of the building panel.

Finally, although the inventive concept has been described above with reference to specific embodiments, it is not intended to be limited to the specific form set forth herein. Rather, the invention is limited only by the accompanying claims. Other embodiments than the specific above are equally possible within the scope of the appended claims. All embodiments may be used separately or in combinations. Angles, dimensions, rounded parts, spaces between surfaces, etc. are only examples and may be adjusted within the basic principles of the invention.

Item Section

Item 1. A method to produce a wear resistant sheet (10) comprising:

providing a first foil (11) comprising a thermoplastic material, applying a second foil (12) comprising a thermoplastic material above the first foil (11), applying a third foil (13) comprising a thermoplastic material above the second foil (12), applying a wear resistant layer (21) on the first foil (11) and/or on the second foil (12) prior to applying the second foil (12) above the first foil (11), applying a wear resistant layer (22) on the second foil (12) and/or the third foil (13) prior to applying the third foil (13) above the second foil (12), and adhering the first foil (11), the second foil (12) and the third foil (13) together by means of heat and pressure for forming the wear resistant sheet (10), wherein the wear resistant layers (21, 22) are provided between the first and second foil (11, 12) and between the second and third foil (12, 13).

Item 2. The method according to item 1, wherein the wear resistant layer (21), applied between the first foil (11) and the second foil (12), is scattered onto the first foil (11) before applying the second foil (12).

Item 3. The method according to item 1 or 2, wherein the wear resistant layer (22), applied between the second foil (12) and the third foil (13), is scattered onto the second foil (12) before applying the third foil (13).

Item 4. The method according to any one of the preceding items, wherein each wear resistant layer (21, 22) comprises wear resistant particles (24).

Item 5. The method according to item 4, wherein each wear resistant layer (21, 22) comprises an amount of at least 99 wt % of the wear resistant particles, or at least 99.5 wt % of the wear resistant particles.

Item 6. The method according to items 4 or 5, wherein the wear resistant particles (24) are aluminum oxide particles.

Item 7. The method according to any one of the items 4-6, wherein the wear resistant particles (24) arranged between the first foil (11) and the second foil (12) are enclosed therein, and the wear resistant particles (24) arranged between the second foil (12) and the third foil (13) are enclosed therein, after adhering the foils (11, 12, 13) together.

Item 8. The method according to any one of the items 4-7, wherein none of the wear resistant particles (24) arranged between the second foil (12) and the third foil (13) protrudes from the third foil (13) after adhering the foils (11, 12, 13) together.

Item 9. The method according to any one of the preceding items, wherein the wear resistant layer (21), applied between the first foil (11) and the second foil (12), is applied at an amount of 5-30 g/m², 7.5-25 g/m², or 10-20 g/m².

Item 10. The method according to any one of the preceding items, wherein the wear resistant layer (22), applied between the second foil (12) and the third foil (13), is applied at an amount of 5-30 g/m², 7.5-25 g/m², or 10-20 g/m².

Item 11. The method according to any one of the preceding items, wherein the amount of wear resistant layer (21, 22) between the first and second foil (11, 12) and between the second and third foil (12, 13) is substantially equal.

Item 12. The method according to any one of the preceding items, wherein the first foil (11) the second foil (12) and/or the third foil (13) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 13. The method according to any one of the preceding items, wherein the first foil (11), the second foil (12) and the third foil (13) each has a thickness of 20-300 µm., or 50-200 µm.

Item 14. A method to produce a building panel (1), comprising
providing a substrate (3),
applying a wear resistant sheet (10) produced according to any one of the items 1-11 above the substrate (3), adhering the substrate (3) and the wear resistant sheet (10), by means of heat and pressure, for forming the building panel (1).

Item 15. A method to produce a building panel (1), comprising:
providing a substrate (3),
applying a first foil (11) comprising a thermoplastic material above the substrate (3),
applying a second foil (12) comprising a thermoplastic material above the first foil (11),
applying a third foil (13) comprising a thermoplastic material above the second foil (12),
applying a wear resistant layer (21) on the first foil (11) and/or on the second foil (12) prior to applying the second foil (12) above the first foil (11),
applying a wear resistant layer (22) on the second foil (12) and/or the third foil (13) prior to applying the third foil (13) above the second foil (12), and
adhering the substrate (3), the first foil (11), the second foil (12) and the third foil (13) together, by means of heat and pressure for forming the building panel (1), wherein the wear resistant layer (21, 22) are provided between the first and the second foil (11, 12) and between the second and third foil (12, 13).

Item 16. The method according to item 15, wherein the wear resistant layer (21), applied between the first foil (11) and the second foil (12), is scattered onto the first foil (11) before applying the second foil (12).

Item 17. The method according to items 15 or 16, wherein the wear resistant layer (22), applied between the second foil (12) and the third foil (13), is scattered onto the second foil (12) before applying the third foil (13).

Item 18. The method according to any one of items 15-17, wherein each wear resistant layer (21, 22) comprises wear resistant particles (24).

Item 19. The method according to item 18, wherein each wear resistant layer (21, 22) comprises an amount of at least 99 wt % of the wear resistant particles, or at least 99.5 wt % of the wear resistant particles.

Item 20. The method according to items 18 or 19, wherein the wear resistant particles (24) are aluminum oxide particles.

Item 21. The method according to any one of the items 18-20, wherein the wear resistant particles (24) arranged between the first foil (11) and the second foil (12) are enclosed therein, and the wear resistant particles (24) arranged between the second foil (12) and the third foil (13) are enclosed therein, after adhering the foils (11, 12, 13) together.

Item 22. The method according to any one of the items 18-21, wherein none of the wear resistant particles ( ) arranged between the second foil ( ) and the third foil ( ) protrudes from the third foil ( ) after adhering the substrate and the foils ( ) together.

Item 23. The method according to any one of the items 15-22, wherein the wear resistant layer (21), applied between the first foil (11) and the second foil (12), is applied at an amount of 5-30 g/m², 7.5-25 g/m², or 10-20 g/m².

Item 24. The method according to any one of the items 15-23, wherein the wear resistant layer (32), applied between the second foil (12) and the third foil (13), is applied at an amount of 5-30 g/m², 7.5-25 g/m², or 10-20 g/m².

Item 25. The method according to any one of the items 15-24, wherein the amount of wear resistant layer (21, 22) between the first and second foil (11, 12) and between the second and third foil (12, 13) is substantially equal.

Item 26. The method according to any one of the items 15-25, wherein the first foil (11) the second foil (12) and/or the third foil (13) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 27. The method according to any one of the items 15-26, wherein the first foil (11), the second foil (12) and the third foil (13) each has a thickness of 20-300 μm., or 50-200 μm.

Item 28. The method according to any one of the items 15-27, wherein the substrate (3) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 29. A method to produce a building panel (1), comprising providing a substrate (3), applying a first foil (11') comprising a thermoplastic material above the substrate (3), applying a second foil (12') comprising a thermoplastic material above the first foil (11'), applying a wear resistant layer (21) on the substrate (3) and/or on the first foil (11') prior to applying the first foil (11') above the substrate (3), applying a wear resistant layer (22) on the first foil (11') and/or on the second foil (12') prior to applying the second foil (12') on the first foil (11'), and adhering the substrate (3), the first foil (11') and the second foil (12') together, by means of heat and pressure for forming the building panel (1), wherein the wear resistant layers (21, 22) are provided between the substrate (3), the first foil (11') and the second foil (12').

Item 30. The method according to item 29, wherein the wear resistant layer (21), applied between the substrate (3) and the first foil (11'), is scattered onto the substrate (3) before applying the first foil (11').

Item 31. The method according to items 29 or 30, wherein the wear resistant layer (22), applied between the first foil (11') and the second foil (12'), is scattered onto the first foil (11') before applying the second foil (12').

Item 32. The method according to any one of items 29-31, wherein each wear resistant layer (21, 22) comprises wear resistant particles (24).

Item 33. The method according to item 32, wherein each wear resistant layer (21, 22) comprises an amount of at least 99 wt % of the wear resistant particles, or at least 99.5 wt % of the wear resistant particles.

Item 34. The method according to items 32 or 33, wherein the wear resistant particles (24) are aluminum oxide particles.

Item 35. The method according to any one of the items 32-34, wherein the wear resistant particles (24) arranged between the substrate (3) and the first foil (11') are enclosed therein, and the wear resistant particles (24) arranged between the first foil (11') and the second foil (12') are enclosed therein, after adhering the substrate (3) and the foils (11', 12') together.

Item 36. The method according to any one of the items 32-35, wherein none of the wear resistant particles (24) arranged between the first foil (11') and the second foil (12') protrudes from the second foil (12') after adhering the substrate (3) and the foils (11', 12') together.

Item 37. The method according to any one of the items 29-36, wherein the wear resistant layer (21), applied between the substrate (3) and the first foil (11'), is applied at an amount of 5-30 g/m², 7.5-25 g/m², or 10-20 g/m².

Item 38. The method according to any one of the items 29-37, wherein the wear resistant layer (32), applied between the first foil (11') and the second foil (12'), is applied at an amount of 5-30 g/m², 7.5-25 g/m², or 10-20 g/m².

Item 39. The method according to any one of the items 29-38, wherein the amount of the wear resistant layer (21) between the substrate (3) and first foil (11') and between the first and second foil (11', 12') is substantially equal.

Item 40. The method according to any one of the items 29-39, wherein the total amount of the wear resistant layers (21, 22) applied, between the substrate (3) and the first foil (11') and between the first foil (11') and the second foil (12'), is 10-60 g/m², 15-50 g/m², or 20-40 g/m².

Item 41. The method according to any one of the items 29-40, wherein the first foil (11') and/or the second foil (12') comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 42. The method according to any one of the items 29-41, wherein the first foil (11') and the second foil (12') each has a thickness of 20-300 μm., or 50-200 μm.

Item 43. The method according to any one of the items 29-42, wherein the substrate (3) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 44. A wear resistant sheet (10), comprising:

a first foil (11) comprising a thermoplastic material, a second foil (12) comprising a thermoplastic material, arranged above the first foil (11), a third foil (13) comprising a thermoplastic material, arranged above the second foil (12), a wear resistant layer (21) arrange between the first foil (11) and the second foil (12), and a wear resistant layer (22) arranged between the second foil (12) and the third foil (13).

Item 45. The wear resistant sheet according to item 44, wherein each wear resistant layer (21, 22) comprises wear resistant particles (24).

Item 46. The wear resistant sheet according to item 45, wherein each wear resistant layer (21, 22) comprises an amount of at least 99 wt % of the wear resistant particles, or at least 99.5 wt % of the wear resistant particles.

Item 47. The wear resistant sheet according to item 45 or 46, wherein the wear resistant particles (24) are aluminum oxide particles.

Item 48. The wear resistant sheet according to any one of the items 45-47, wherein the wear resistant particles (24) arranged between the first foil (11) and the second foil (12) are enclosed therein, and the wear resistant particles (24) arranged between the second foil (12) and the third foil (13) are enclosed therein.

Item 49. The wear resistant sheet according to any one of the items 45-48, wherein none of the wear resistant particles (24) arranged between the second foil (12) and the third foil (13) protrudes from the third foil (13).

Item 50. The wear resistant sheet according to any one of the items 44-49, wherein the wear resistant layer (21), applied between the first foil (11) and the second foil (12), is applied at an amount of 5-30 g/m², 7.5-25 g/m², or 10-20 g/m².

Item 51. The wear resistant sheet according to any one of the items 44-50, wherein the wear resistant layer (22), applied between the second foil (12) and the third foil (13), is applied at an amount of 5-30 g/m², 7.5-25 g/m², or 10-20 g/m².

Item 52. The wear resistant sheet according to any one of the items 44-51, wherein the amount of the wear resistant layer (21, 22) between the first and second foil (11, 12) and between the second and third foil (12, 13) is substantially equal.

Item 53. The wear resistant sheet according to any one of the items 44-52, wherein the total amount of the wear resistant layers (21, 22) applied, between the first foil (11) and the second foil (12) and between the second foil (12) and the third foil (13), is 10-60 g/m², 15-50 g/m², or 20-40 g/m².

Item 54. The wear resistant sheet according to any one of the items 44-53, wherein the first foil (11) the second foil (12) and/or the third foil (13) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 55. The wear resistant sheet according to any one of the items 44-54, wherein the first foil (11), the second foil (12) and the third foil (13) each has a thickness of 20-300 µm., or 50-200 µm.

Item 56. A building panel, comprising:
a substrate (3), and
a wear resistant sheet (10) according to any one of the items 44-56, arranged on the substrate (3).

Item 57. The building panel according to item 56, wherein the substrate (3) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 58. A building panel, comprising:
a substrate (3),
a first foil (11') comprising a thermoplastic material, arranged above the substrate (3),
a second foil (12') comprising a thermoplastic material, arranged above the first foil (11'),
a wear resistant layer (21) arrange between the substrate (3) and the first foil (11'), and
a wear resistant layer (22) arranged between the first foil (11') and the second foil (12').

Item 59. The building panel according to item 58, wherein each wear resistant layer (21, 22) comprises wear resistant particles (24).

Item 60. The building panel according to item 59, wherein each wear resistant layer (21, 22) comprises an amount of at least 99 wt % of the wear resistant particles, or at least 99.5 wt % of the wear resistant particles.

Item 61. The building panel according to items 59 or 60, wherein the wear resistant particles (24) are aluminum oxide particles.

Item 62. The building panel according to any one of the items 59-61, wherein the wear resistant particles (24) arranged between the substrate (3) and the first foil (11') are enclosed therein, and the wear resistant particles (24) arranged between the first foil (11') and the second foil (12') are enclosed therein.

Item 63. The building panel according to any one of the items 59-62, wherein none of the wear resistant particles (24) arranged between the first foil (11') and the second foil (12') protrudes from the second foil (12').

Item 64. The building panel according to any one of the items 58-63, wherein the wear resistant layer (21), applied between the substrate (3) and the first foil (11'), is applied at an amount of 5-30 g/m², 7.5-25 g/m², or 10-20 g/m².

Item 65. The building panel according to any one of the items 58-64, wherein the wear resistant layer (22), applied between the first foil (11') and the second foil (12'), is applied at an amount of 5-30 g/m², 7.5-25 g/m², or 10-20 g/m².

Item 66. The building panel according to any one of the items 58-65, wherein the amount of the wear resistant layer (21, 22) between the substrate (3) and the first foil (11') and between the first and second foil (11', 12') is substantially equal.

Item 67. The building panel according to any one of the items 58-66, wherein the total amount of the wear resistant layers (21, 22), between the substrate (3) and the first foil (11') and between the first foil (11') and the second foil (12'), is 10-60 g/m², 15-50 g/m², or 20-40 g/m².

Item 68. The building panel according to any one of the items 58-67, wherein the first foil (11') and/or the second foil (12') comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

Item 69. The building panel according to any one of the items 58-68, wherein the first foil (11') and the second foil (12') each has a thickness of 20-300 µm., or 50-200 µm.

Item 70. The building panel according to any one of the items 58-69, wherein the substrate (3) comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The invention claimed is:

1. A method to produce a wear resistant sheet comprising:
providing a first foil, comprising a thermoplastic material,
applying a second foil, comprising a thermoplastic material, above the first foil,
applying a third foil, comprising a thermoplastic material, above the second foil,
applying a wear resistant layer comprising wear resistant particles on the first foil and/or on the second foil prior to applying the second foil above the first foil,
applying a wear resistant layer comprising wear resistant particles on the second foil and/or the third foil prior to applying the third foil above the second foil, and
adhering the first foil, the second foil and the third foil together by means of heat and pressure for forming the wear resistant sheet, wherein the wear resistant layers are provided between the first foil and second foil and between the second foil and third foil, wherein none of the wear resistant particles arranged between the second foil and the third foil protrude above an upper surface of the third foil after adhering the foils together.

2. The method according to claim 1, wherein each wear resistant layer comprises an amount of at least 99 wt % of the wear resistant particles.

3. The method according to claim 1, wherein the wear resistant particles are aluminum oxide particles.

4. The method according to claim 1, wherein the wear resistant particles arranged between the first foil and the second foil are enclosed therein, and the wear resistant particles arranged between the second foil and the third foil are enclosed therein, after adhering the foils together.

5. The method according to claim 1, wherein the wear resistant layer, applied between the first foil and the second foil, is applied at an amount of 5-30 g/m$^2$.

6. The method according to claim 1, wherein the wear resistant layer, applied between the second foil and the third foil, is applied at an amount of 5-30 g/m$^2$.

7. The method according to claim 1, wherein the amount of wear resistant layer between the first foil and second foil and between the second foil and third foil is substantially equal.

8. The method according to claim 1, wherein the first foil, the second foil and the third foil each have a thickness of 20-300 μm.

9. A method to produce a building panel, comprising
providing a substrate,
applying a wear resistant sheet produced according to claim 1, above the substrate,
adhering the substrate and the wear resistant sheet, by means of heat and pressure, for forming the building panel.

10. The method according to claim 9, further comprising:
applying a decorative layer between the substrate and the wear resistant sheet before adhering the substrate, the decorative layer and the wear resistant sheet together, by means of heat and pressure, for forming the building panel.

11. A method to produce a building panel, comprising:
providing a substrate,
applying a first foil comprising a thermoplastic material above the substrate,
applying a second foil comprising a thermoplastic material above the first foil,
applying a third foil comprising a thermoplastic material above the second foil,
applying a wear resistant layer comprising wear resistant particles on the first foil and/or on the second foil prior to applying the second foil above the first foil,
applying a wear resistant layer comprising wear resistant particles on the second foil and/or the third foil prior to applying the third foil above the second foil, and adhering the substrate, the first foil, the second foil and the third foil together, by means of heat and pressure, for forming the building panel, wherein the wear resistant layer are provided between the first foil and the second foil and between the second foil and third foil, wherein none of the wear resistant particles arranged between the second foil and the third foil protrude above an upper surface of the third foil after adhering the foils together.

12. The method according to claim 11, further comprising:
applying a decorative layer between the substrate and the first foil before adhering the substrate, the decorative layer and the foils together, by means of heat and pressure, for forming the building panel.

13. A method to produce a building panel, comprising:
providing a substrate,
applying a first foil comprising a thermoplastic material above the substrate,
applying a second foil comprising a thermoplastic material above the first foil,
applying a wear resistant layer comprising wear resistant particles on the substrate and/or on the first foil prior to applying the first foil above the substrate,
applying a wear resistant layer comprising wear resistant particles on the first foil and/or on the second foil prior to applying the second foil on the first foil, and
adhering the substrate, the first foil and the second foil together, by means of heat and pressure for forming the building panel, wherein the wear resistant layers are provided between the substrate, the first foil and the second foil, wherein none of the wear resistant particles arranged between the first foil and the second foil protrude above an upper surface of the second foil after adhering the foils together.

14. The method according to claim 13, further comprising:
applying a decorative layer between the substrate and the wear resistant layer before adhering the substrate, the decorative layer and the foils together, by means of heat and pressure, for forming the building panel.

\* \* \* \* \*